(12) United States Patent
Donato

(10) Patent No.: US 8,063,934 B2
(45) Date of Patent: Nov. 22, 2011

(54) HELMET FOR DISPLAYING ENVIRONMENTAL IMAGES IN CRITICAL ENVIRONMENTS

(75) Inventor: Giuseppe Donato, Milan (IT)

(73) Assignee: Energy Laser S.R.L., Carnate (IT)

( * ) Notice: Subject to any disclaimer, the term of this patent is extended or adjusted under 35 U.S.C. 154(b) by 1244 days.

(21) Appl. No.: 10/538,773

(22) PCT Filed: Dec. 29, 2003

(86) PCT No.: PCT/EP03/14943
§ 371 (c)(1),
(2), (4) Date: Jun. 10, 2005

(87) PCT Pub. No.: WO2004/068212
PCT Pub. Date: Aug. 12, 2004

(65) Prior Publication Data
US 2006/0048286 A1 Mar. 9, 2006

(30) Foreign Application Priority Data
Jan. 27, 2003 (IT) .............................. MI2003A0121

(51) Int. Cl.
*H04N 7/18* (2006.01)
*G09G 5/00* (2006.01)

(52) U.S. Cl. ............................................ 348/82; 345/8
(58) Field of Classification Search ................... 348/82; 345/8
See application file for complete search history.

(56) References Cited

U.S. PATENT DOCUMENTS

| 5,835,264 | A | * | 11/1998 | Tandler et al. ................ 359/377 |
| 5,949,582 | A | | 9/1999 | Coombs |
| 6,028,627 | A | * | 2/2000 | Helmsderfer ................. 348/157 |
| 6,121,953 | A | * | 9/2000 | Walker ............................ 345/156 |
| 6,255,650 | B1 | | 7/2001 | Krivoy et al. |
| 6,456,261 | B1 | * | 9/2002 | Zhang ................................. 345/8 |
| 2003/0053664 | A1 | * | 3/2003 | Pavlidis et al. ............... 382/117 |

FOREIGN PATENT DOCUMENTS

| EP | A-0 899599 | 3/1999 |
| EP | A-1 107 041 | 6/2001 |
| WO | A 00/45211 | 8/2000 |

* cited by examiner

*Primary Examiner* — Jay Au Patel
*Assistant Examiner* — Richard Torrente
(74) *Attorney, Agent, or Firm* — Modiano & Associati; Albert Josif; Daniel O'Byrne

(57) ABSTRACT

A helmet for displaying environmental images in critical environments, comprising at least one video camera and a display for displaying environmental images; the helmet also has a supporting structure that can be anchored to the helmet in order to support the at least one video camera and the display; the supporting structure has a front adapter that can be coupled to a front edge of the helmet, a rear adapter that can be coupled to a rear edge of the helmet, and a connecting element for mutually connecting the front adapter and the rear adapter.

21 Claims, 14 Drawing Sheets

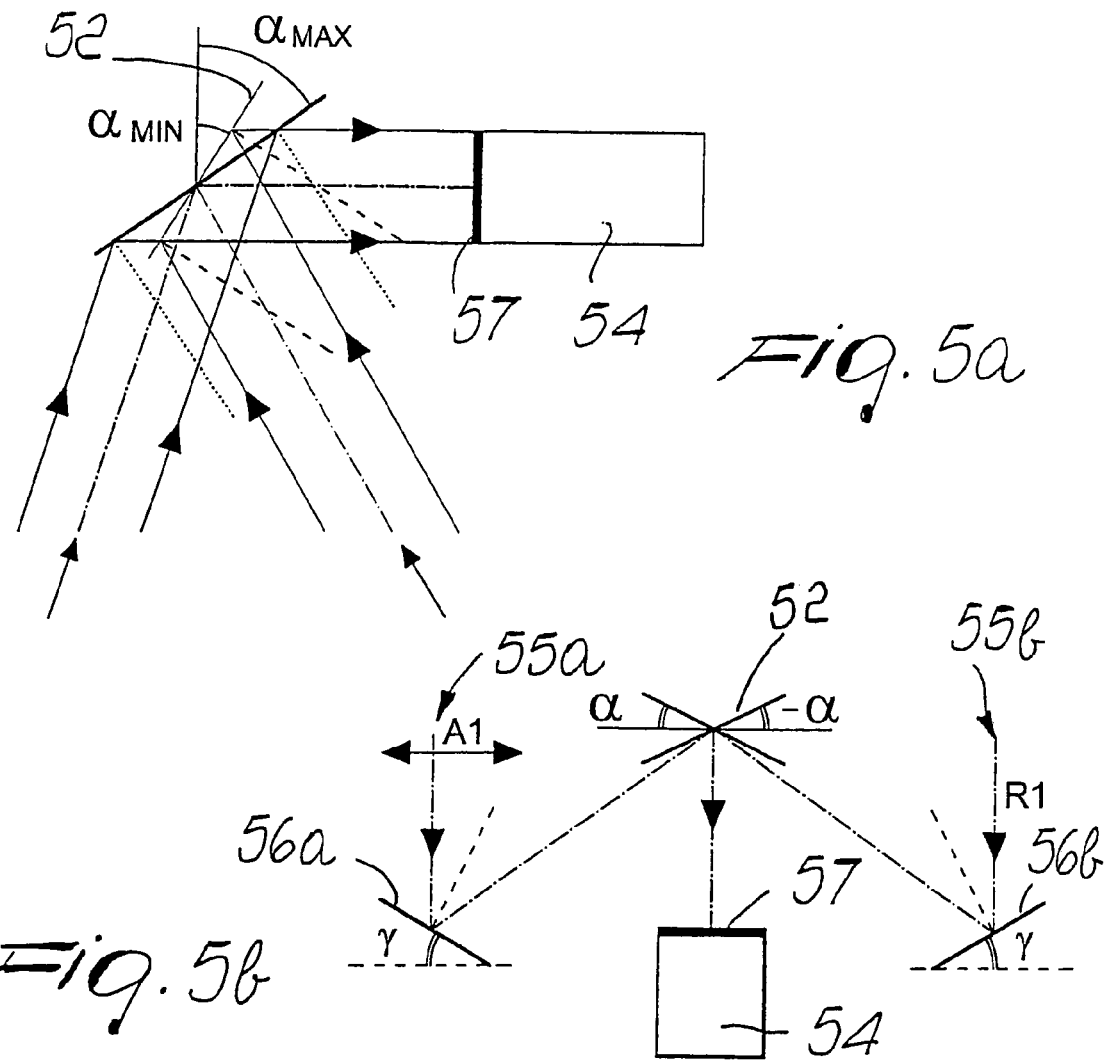
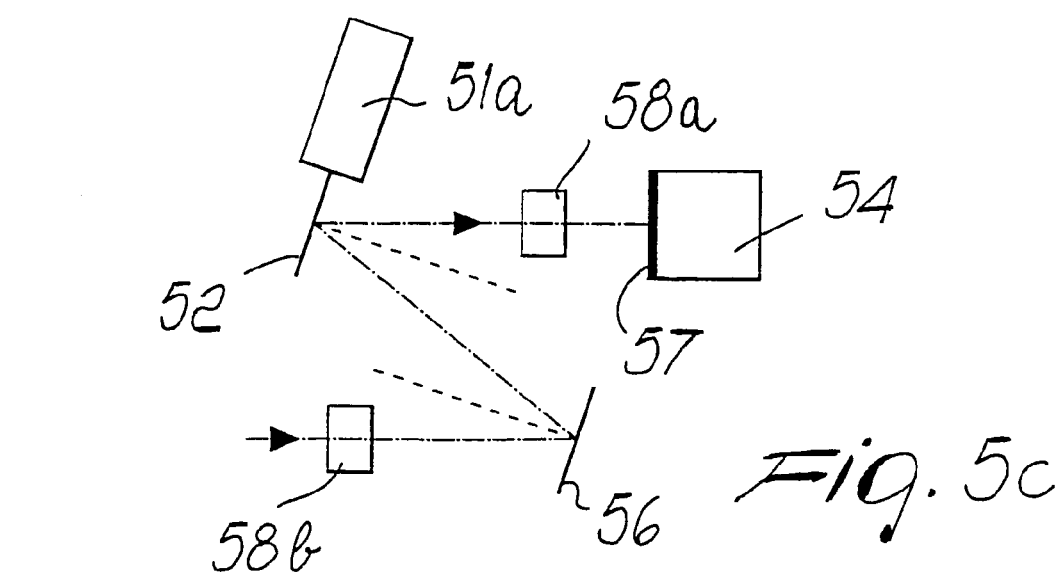

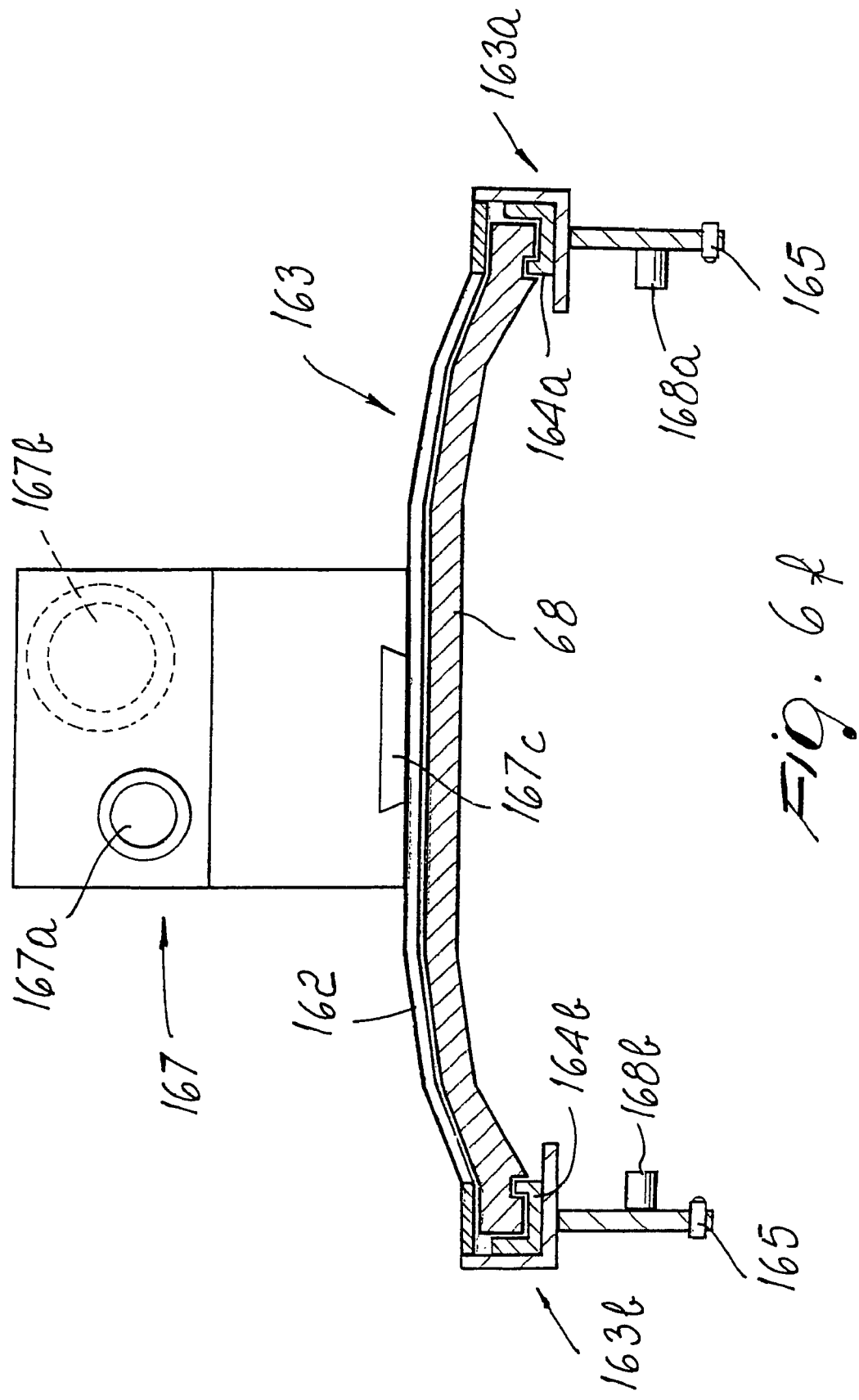

HELMET FOR DISPLAYING ENVIRONMENTAL IMAGES IN CRITICAL ENVIRONMENTS

TECHNICAL FIELD

The present invention relates to a helmet for displaying environmental images in critical environments, particularly areas at risk of accident or in which an accident has occurred such as tunnels, subways, wooded areas, refineries, nuclear facilities, shopping centers and in general sites with high concentrations of people.

BACKGROUND ART

In these critical areas, actions for intervention and rescue on the part of firefighters or law enforcement personnel in case of an accident are particularly risky for the injured people, for their rescuers and for all the people involved in the accident, since the escape routes are often difficult to detect. The smoke of a fire, darkness or fog are the factors that most significantly compromise the effectiveness and swiftness of an intervention.

These factors can themselves be the cause of an accident or can worsen one, since even in the absence of an accident, in certain critical areas (such as for example tunnels) it is necessary to ensure safety by preventing accidents caused by particular environmental conditions.

Systems are currently known which send images from fixed stations to a control center, which coordinates operations by radio.

Portable or helmet-mounted mobile systems that improve the vision of the individual user are also known. In particular, U.S. Pat. No. 6,255,650 in the name of Flir Systems, Inc. describes a system that is formed by an infrared (IR) television camera, a display, electronic and power supply circuits which are integrated in a portable, stand-alone apparatus that is shaped so as to be worn on one's head; this television camera-display system improves vision in environments with dense particulate, with extreme temperatures such as those that occur in fires. Vision can be monoscopic or stereoscopic and is enhanced by color-coding the temperature, by means of a processor and by way of reflective and opaque lenses arranged approximately at eye level in order to produce bright and sharp images.

Optionally, the system comprises an external video recorder and transmitter; the video transmitter also transmits radiometric data.

U.S. Pat. No. 5,200,827 describes another video camera-display system that is conceived to be mounted on the helmet of a soldier. The system allows to display at close range pictures that originate from a remote location and is used for example to transmit pictures from the combat area toward the rearguard.

Transmission between the video camera (mounted on a rifle or hinged on the helmet) and the display (mounted on the helmet) occurs by means of an electric wire, optical fiber or wirelessly, and a transmitter allows multiple individuals to view the picture that arrives from a single video camera; each one of the involved individuals can select the picture generated by several remote video cameras.

The display used in U.S. Pat. No. 5,200,827 is transparent in order to allow the user to view the environment; in particular, the picture is obtained by means of a holographic projection on a clear peak. Moreover, the display operates with an image separator arranged on the line of sight of the person in order to allow to view a superimposed scene of the object on the line of sight and on the display.

Finally, patent FR 2602347 describes an apparatus that is constituted by an infrared sensor, a laser rangefinder and a device for alignment with the rangefinder. The apparatus operates on two optical communication pathways that work in different spectral domains.

Known systems and devices are limited in monitoring and rescue applications in critical areas because they do not integrate information effectively. In particular, fixed-station systems require a control center that coordinates operations by radio, and this control center does not retransmit received pictures or any real-time processing of said pictures.

Furthermore, the pictures displayed on the display originate from a single video camera and interaction with other video cameras occurs according to a direct link.

DISCLOSURE OF THE INVENTION

The aim of the present invention is to overcome the limitations described above by providing a helmet for surveillance of critical areas that is of the modular type and in which the components can be inserted in an integrated system that allows users to share a greater amount of information.

Within this aim, an object of the invention is to increase intervention efficiency in case of accident and to reduce the risks linked to said intervention operations.

Another object is to improve the quality of the picture displayed by the user in order to make the monitored situation more comprehensible.

Another object is to provide an anchoring system that is flexible and inexpensive, allowing use on existing helmets.

This aim and these and other objects that will become better apparent hereinafter are achieved by the helmet for displaying environmental images in critical environments according to the present invention, which comprises at least one video camera and means for displaying environmental images, characterized in that it comprises a supporting structure that can be anchored to said helmet in order to support said at least one video camera and said display means, said supporting structure comprising a front adapter that can be coupled to a front edge of said helmet, a rear adapter that can be coupled to a rear edge of said helmet, and a connecting element for mutually connecting said front adapter and said rear adapter.

BRIEF DESCRIPTION OF THE DRAWINGS

Further characteristics and advantages of the invention will become better apparent from the description of a preferred but not exclusive embodiment of the modular surveillance system, illustrated by way of nonlimiting example in the accompanying drawings, wherein:

FIG. 3a is an exploded view of the block diagram of the electronic circuit of FIG. 2a;

FIG. 5a is a schematic map view of the arrangement of the components located upstream of a video camera or optionally of a combination of mutually coupled video cameras;

FIG. 5b is a schematic map view of the arrangement of the components upstream of a video camera or optionally of a combination of mutually coupled video cameras;

FIG. 5c is a schematic side view of the structure for displaying stereoscopic images, with additional details;

FIG. 6f is a front view of a helmet adaptor according to a particular aspect of the invention;

WAYS TO CARRYING OUT THE INVENTION

Figure 1:
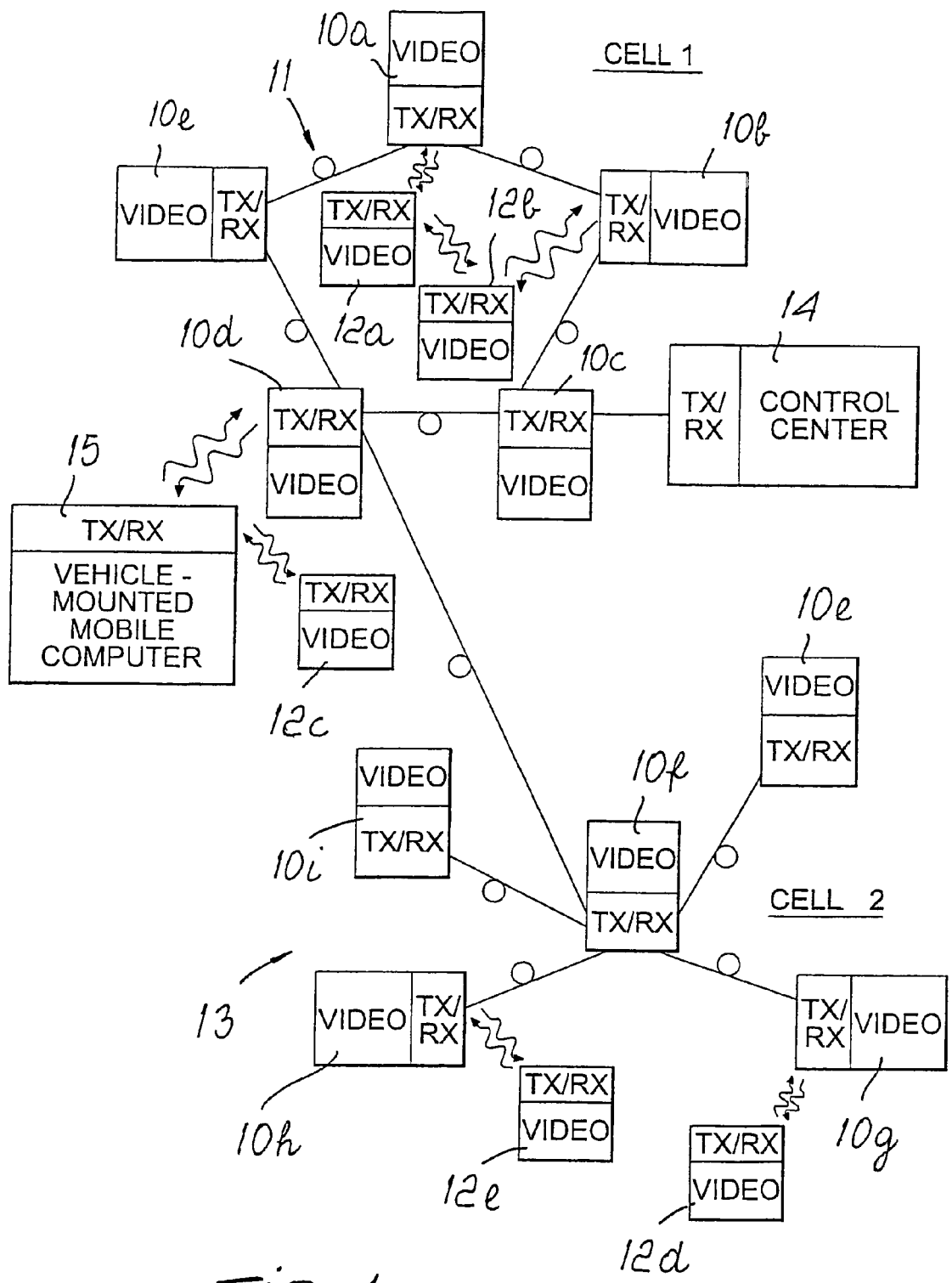
FIG. 1 is a block diagram of a surveillance system for application to the invention.

With reference to FIG. 1, the surveillance system comprises a number of fixed stations 10a-101 and a number of mobile stations 12a-12e.

The fixed stations are inserted in a network, preferably of the fiber-optic type with known layouts such as a ring 11 or a star 13 or linear layouts, and are mutually connected according to a cluster-type layout, in which combinations of the layouts 11 and 13 and linear layouts are repeated according to the surveillance requirements to be met.

Said fiber-optic system can be connected to a control center 14, which has processing and supervision functions, and to a mobile processing center 15, which is typically mounted on a vehicle. Each station can communicate bidirectionally with any other fixed or mobile station.

The mobile stations are of different types, and as will become better apparent hereinafter, they can be mounted on a helmet, on vehicles such as cars, trucks, aircraft, on autonomous self-propelled robots, or on handheld portable systems.

In FIG. 1, each station has been shown schematically as being constituted by a video block (VIDEO) and a communication block (TX/RX).

The distinction into two blocks is purely an example; actually, every station is built according to a modular structure, in which the various components are removable and interchangeable in their arrangement, depending on the particular type of station in which they are mounted.

The video block (VIDEO) comprises the components required for acquisition, processing and display of the environmental images.

The communications block (TX/RX) instead comprises the means for communicating the acquired environmental images that are needed in order to receive and transmit environmental images (encoded into video signals according to known methods); each mobile station is a terminal that simultaneously receives and transmits video images from and toward other stations of the network.

In greater detail, each mobile station comprises at least one video camera for acquiring environmental images and at least one display to allow the viewing of said images by a user; each fixed station also comprises at least one video camera and optionally a display, which is not necessarily mounted in the same location as the station.

Preferably, the stations further comprise a number of additional video cameras that are coupled to said at least one video camera for the acquisition, along a same optical axis, of images of a same environment in different spectral domains, according to the arrangement and the connections described in greater detail hereinafter.

The mobile processing center and the control center comprise at least one display for displaying the video signals of the network and optionally one or more video cameras.

The displays can be of a common type, or, as described hereinafter, of a more specific type, depending on the applications.

Multiple video cameras can be mounted in the individual station; a preferred embodiment uses at least one video camera of the thermographic type, which operates in the infrared spectral range (in order to detect wavelengths between approximately 2 and 14 µm), and at least one second video camera, which operates in a spectral domain that is different from the infrared (for example, in the visible-light range between 400 and 700 nm or as an alternative in the near infrared from 700 to 1900 nm).

Preferably, each station uses two video signals that are either of the thermographic type, i.e., characterized by radiation that originates from the emission of the observed bodies themselves (any body emits heat radiation merely due to the fact that its temperature is higher than absolute zero), or of the reflective type, in which the radiation detected by the video camera is derived by reflection from the light emitted by an external source that illuminates the observed objects. In the case of low brightness, the detected radiation is amplified with an image intensifier (designated hereinafter with the symbol $I^2$).

Since image intensifiers can also detect radiation in the near infrared, a preferred embodiment of the invention comprises not only an infrared video camera (designated hereinafter also with the expression "IR video camera") and a video camera that operates in the visible-light range (designated hereinafter also as "VIS video camera"), but also an image intensifier that operates as an alternative to the VIS video camera, depending on the conditions of the degree of brightness of the environment to be monitored. In particular, the generic station activates for daytime vision a thermographic video camera in combination with a visible-light video camera, while for night vision it activates the thermographic video camera in combination with an image intensifier.

This use of vision in different spectral domains is an example and is not exclusive to the generic station.

In each station that comprises multiple video cameras that operate in different spectral regimes, the video cameras are mutually coupled, have a single viewpoint and are connected to a single electronic circuit for processing the acquired signals, which collects the images taken in the various spectral domains, processes and sends them to the display or, by way of the communication means, sends them to other stations, for example to a station that is mounted on a vehicle or helmet of a rescuer or on a portable system.

Figure 2A:
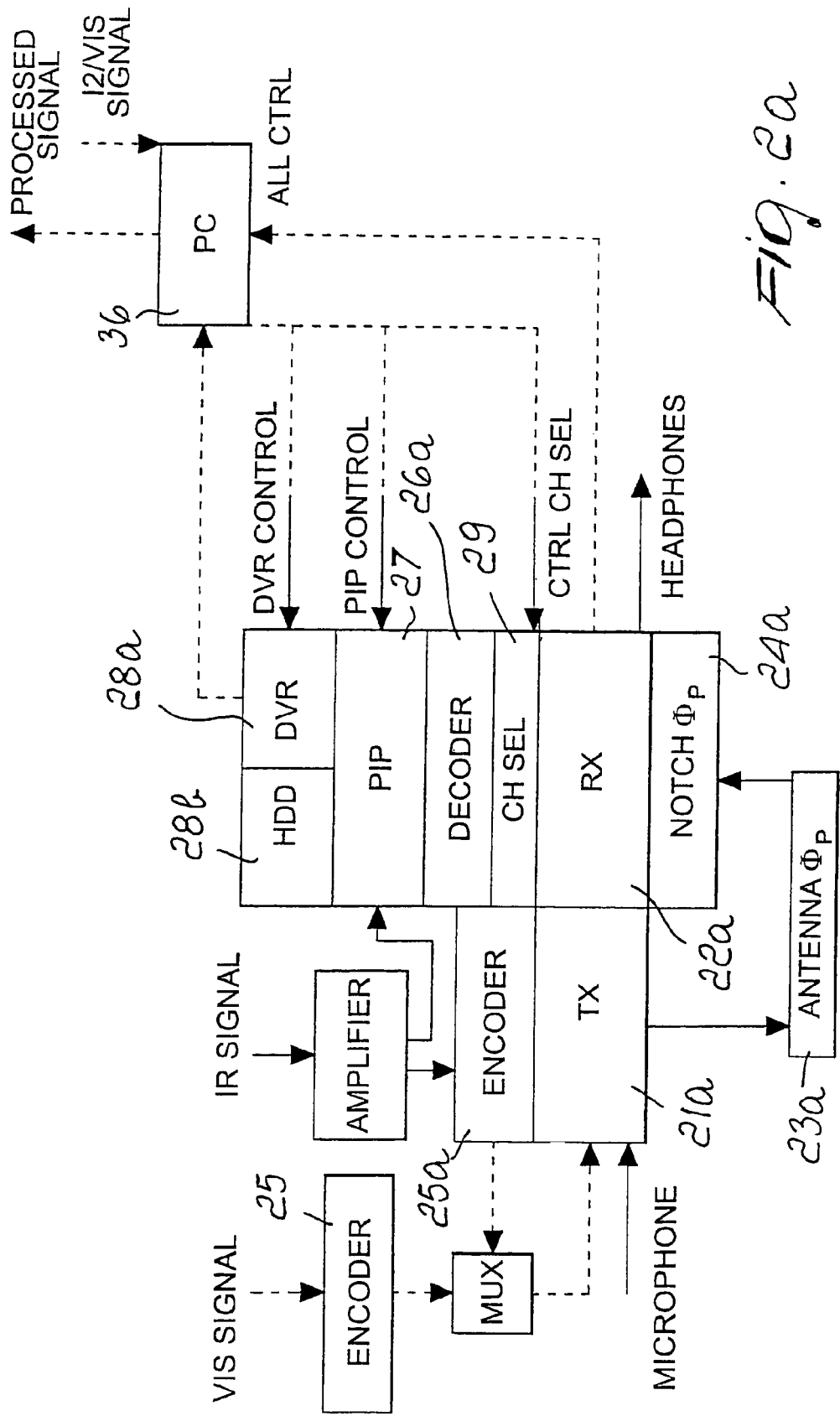
FIG. 2a is a simplified block diagram of the electronic circuit for processing the signals acquired in a mobile station.

With reference to FIG. 2a, the means for communicating the acquired images of a mobile station comprise a transmitter 21a in order to transmit by radio at least one video signal of a respective video camera of the mobile station over a respective communication channel, a receiver 22a for receiving by radio at least one video signal that arrives from another station, and at least one aerial 23a for bi-directional communication with the mobile stations.

In greater detail, the transmitter 21a transmits at a certain carrier frequency ($f_P$) a first video signal (that originates from a video camera of the station) on a first channel $\Phi_{1,1}$ and optionally transmits another additional video signal that originates from another video camera of the station on a second channel $\Phi_{1,2}$.

Hereinafter, the reference sign $\Phi_{i,j}$ designates the generic channel on which the stations transmit and receive video information, where i=1, 2, ..., N designates the identification number of the transmitting station, N indicates the number of total stations (fixed plus mobile stations) and j=1,2 depending on whether the video signal originates from a video camera of the thermographic type (j=1) or from a visible-light video camera or from a video camera with image intensifier (j=2).

In order to reduce the number of channels used, the IR and VIS video signals can be multiplexed before being transmitted by radio.

The circuit shown in FIG. 2a furthermore comprises a multiplexer (MUX), by means of which the two video signals (for example the infrared and visible-light signals) of the individual station can be multiplexed on a single channel by using known methods. In this case, only one of the two signals, typically the video signal that originates from the infrared thermal camera installed on the mobile station, can be sent in input to the PIP circuit, chosen at will by the operator.

Moreover, the circuit can comprise a demultiplexer (not shown in the figure) for receiving two video signals (IR and VIS) on a single reception channel.

An alternative embodiment comprises two circuits of the type shown in FIG. 2a, which do not have a multiplexer; a first circuit receives in input the video signal that originates from a video camera of the VIS type, while the second circuit receives in input the video signal that originates from a video camera of the IR type.

In the more general case in which the individual station includes more than two video cameras that are active simultaneously, the control circuit can be controlled by the operator in order to choose which video signal in reception, among all the available signals, is to be superimposed by using the PIP module described hereinafter, by means of a circuit that is similar to the one described in FIG. 2a.

The receiver 22a operates on a channel that is different from the transmission channel of the mobile station and is preferably of the tunable type, i.e., it comprises a filter for selecting the channel 29 in order to operate at different receiving frequencies (for example two frequencies $f_1$ and $f_2$).

Optionally, the receiver comprises a notch filter 24a that is centered on the transmission frequencies of the transmitter 21a in order to attenuate the signal received by the transmitter 21a of the same station; the signal received from the transmitter 21a, in view of its higher power, would in fact tend to hide the signals that originate from other stations.

The wireless communication frequencies are centered around different carriers, that can be arranged in a certain area (for example, centered around 390 MHz, 1100 MHz, 2000 MHz, 2400 MHz, 5 GHz, 10 GHz); it is optionally possible to use simultaneously two or more carrier frequencies with multiple transmission frequencies centered around them, since the signal transmissions can be subject to different local standards.

The communication means further comprise means 25a for encoding the video signals to be transmitted and means 26a for decoding the received video signals, so that different stations use a same communication channel.

For example, encoding and decoding can be obtained by means of known signal quadrature and orthogonalization methods, with "Spread Spectrum" methods of the DSSS, FHSS or OFDM type, or access methods of the TDMA or FDMA or CDMA or IEEE802.11 type.

In the case of CDMA-type access, the various users are distinguished on the same channel by assigning a different code to each user; a multiplication operation associates a numeric sequence (code) with each signal to be transmitted over the communication channel, with a transmission rate that is much faster than the speed of information to be transmitted. In this manner, the code sequences of users who share the same channel are mutually different and scarcely correlated.

In ideal conditions, the CDMA technique allows the information retrieval operation to cancel the effect of mutual interference and allows to extract the intended signal.

If spread-spectrum methods of the OFDM type are used, the data are distributed over a large number of carriers spaced apart at specific frequencies. The benefits of this method are high spectrum efficiency, recovery from RF interference, and lower signal distortion due to the fact that the transmitted signals reach the receiver by using different paths of different lengths. This characteristic is extremely useful in the case of moving mobile stations, which receive signals from fixed points arranged at different distances that vary as the position of the mobile station varies.

As a complement, or as an alternative, to the means 25a for encoding the video signals to be transmitted and to the means 26a for decoding the received video signals, in order to allow use of a same communication channel by different stations, mechanisms are used to encrypt the signal that is transmitted wirelessly, in order to prevent its interception by unauthorized users. This encryption process is particularly useful in the case of transmission of signals in analog form and if each video channel coincides with a distinct and definite carrier frequency, while for digital signals the video signal ciphering and encryption process can be performed during image digitizing.

Again with reference to FIG. 2a, the electronic processing circuit of each mobile station comprises an electronic circuit 27 for superimposing on the same display images that originate from different stations; this circuit is preferably of the PIP type.

The PIP circuit, which is preferably present only on mobile stations, allows to arrange side by side and/or display by superimposing on the same display images that arrive from different viewpoints, in which the main image is preferably generated by the video camera of the mobile station of the user A while the superimposed image can originate from the same monitored environment by means of a wireless communication that originates directly from a fixed station arranged in the vicinity of the user A, or originates from another user B who is also in the vicinity of A and also has a similar mobile station, or finally from a remotely located video camera, i.e., a video camera that sends its signal over fiber optics and makes it available at another terminal of the surveillance system where there is A, who would otherwise not have access to these video images. The PIP circuit superimposes the image that arrives from the thermographic video camera of the user (or alternatively that arrives from the visible-light video camera of the user) with the image that arrives from another station on the same display. In the other cases it allows to superimpose perfectly images that arrive from a same optical axis or optionally to arrange them side by side.

The electronic processing circuit further comprises means for recording video information, particularly a digital recorder 28a with hard disk recording means 28b.

Optionally, the electronic processing circuit comprises a microphone and a loudspeaker (not shown in the figures) that are connected thereto in order to acquire and play back audio signals. In this case, the audio signals also can be shared among the various stations of the system.

The electronic processing circuit is completed by a controller for modifying the controls according to the requirements of the user and by a battery.

Figure 2B:
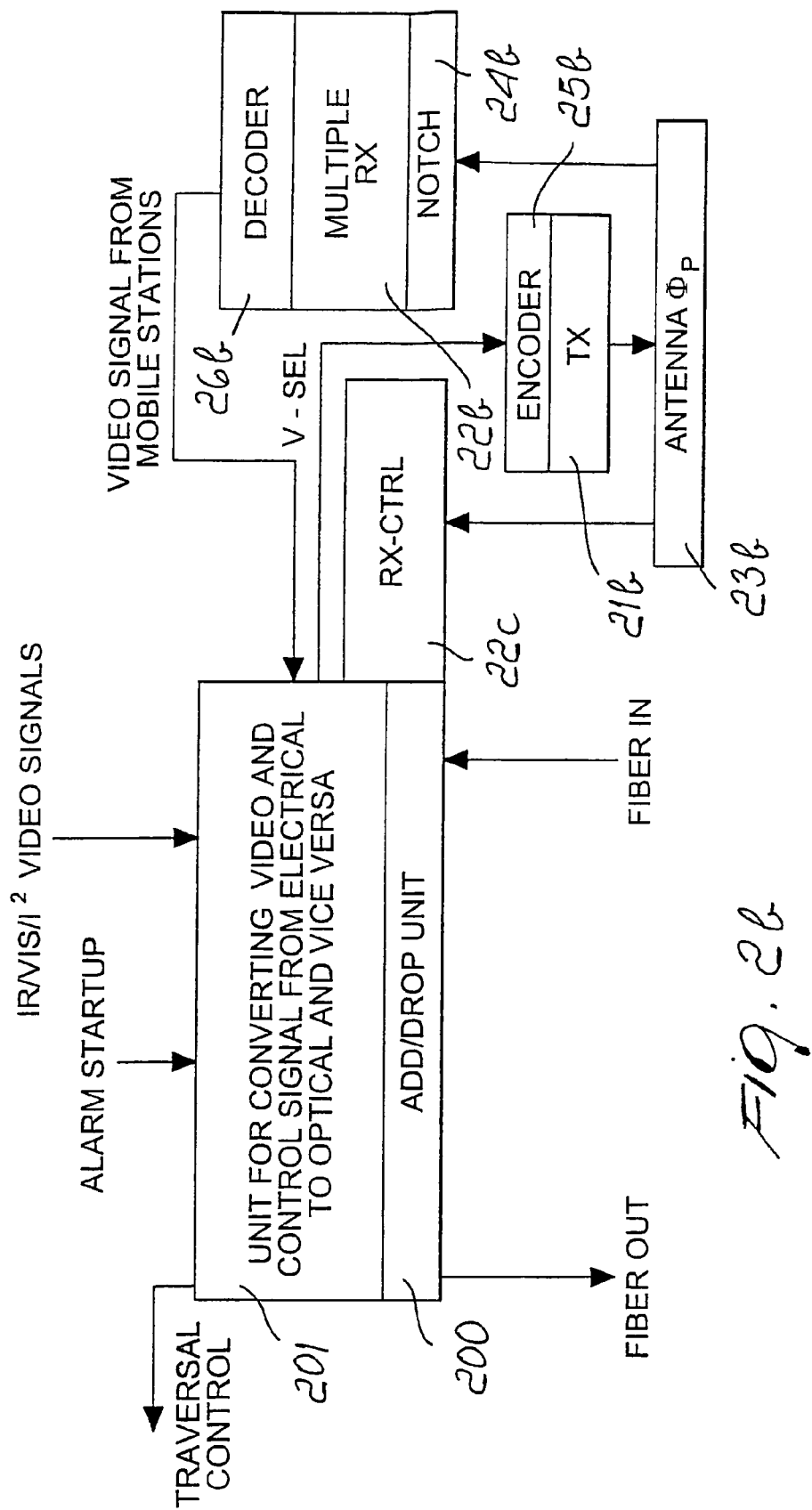
FIG. 2b is a simplified block diagram of the electronic circuit for processing the signals acquired in a fixed station.

With reference to FIG. 2b, the means for communicating the acquired images comprise a transmitter 21b, a receiver 22b, an antenna 23b for communicating with the mobile stations, and a unit 201 for electrical/optical-optical/electrical (E/O-O/E) conversion for converting the electrical signal processed by the circuit into an optical signal to be sent over fiber optics and for converting the optical signal that arrives from the fiber optics into an electrical signal to be processed electronically.

The E/O-O/E conversion unit 201 is connected to an ADD/DROP unit 200, for adding the video image converted into an optical signal to the channels that are present on the fiber optics (ADD function) and vice versa for selecting from the fiber optics the intended channel (DROP function) in order to extract video information. The ADD/DROP unit 200 comprises at least one ADD module and at least one DROP module, as described in greater detail with reference to FIG. 3b.

The channels are preferably input to the fiber optics with an access protocol of the ATM type.

Furthermore, the fixed station comprises multiple receiving stations 22b for receiving by radio the video channels transmitted by mobile stations. In particular, if M is the number of mobile stations of the system and since each mobile station transmits preferably two video signals, the multiple receiving means comprise 2M separate video receivers if each channel coincides with a separate transmission frequency or a number that is smaller than 2M if distinct transmission protocols are used.

Furthermore, the fixed station comprises means for selecting video signals from the fixed network and therefore for selecting video signals that originate from any station of the modular surveillance system.

The means for selecting video signals from the fixed network comprise a second receiver 22c for receiving, by means of a control signal that is transmitted by radio, the selection of the chosen video camera of the surveillance network on the part of the mobile station. Said control signal is generally at a frequency that is different from the frequency on which the video signals are broadcast, and once it is received by the second receiver 22c it activates the selection function that controls the routing of the video signal, as described in detail hereinafter.

The signal of the channel $\lambda_{SEL}$ is then converted into an electrical signal (designated by $V_{SEL}$) in the electrical/optical conversion module 201, is encoded by the encoder 25b, and is transmitted by radio over a channel (designated by $\Phi_{SEL}$), by means of the transmitter 21b of the fixed station.

An alarm generator system (typically an external additional component not shown in the figure) is optionally provided on each fixed station, and in case of an alarm detected proximate to the station said system activates the operation of the system by means of wireless transmission from the fixed stations.

Said alarm signal can be generated by an appropriate sensor or simply by the reception of a signal of a mobile frequency received by radio. The alarm sensor is for example a sensor of the pyroelectric type that can be activated by abnormal heat generation; the sensor generates an alarm signal that activates the fixed station and accordingly causes the surveillance system to pass from a surveillance status for normal control to an alert status in which all the functions of the station are active. The alarm signal can also be generated by analyzing the video image of the video camera on the fixed station by means of software for detecting the motion of people or objects in restricted areas (for example in intrusion prevention or perimeter control systems).

In order to add flexibility to the system, the fixed station preferably transmits by radio on at least two channels $\Phi_{SEL,0}$ and $\Phi_{SEL,1}$; on the channel $\Phi_{SEL,0}$, all fixed stations transmit the same video signal that originates from a video camera of the surveillance system (typically the one that is taking the most significant image and is therefore better positioned with respect to the critical area to be observed), while on the second channel $\Phi_{SEL,1}$ the operator, from his mobile station, can select a video signal that is transmitted only by the fixed station that is closest to him.

Since there can be multiple operators provided with a mobile station, the channel $\Phi_{SEL,1}$ is preferably selected by the rescue operator, who has priority privileges for actuating the channel change by remote control.

It is possible to further increase the flexibility of the surveillance system by means of a transmission from the fixed station on L channels $\Phi_{SEL,1}, \ldots, \Phi_{SEL,h}, \ldots, \Phi_{SEL,L}$, one for each mobile station, which correspond to the total of the L mobile stations that are present and are able to select the video channel that they wish to receive, by virtue of a control signal sent by radio. In this case, the control signal is sent by the generic mobile station h on the channel $\Phi_{CTRL,h}$, which identifies the operator h by means of a code; every time an image change command is sent from the mobile station h, the fixed station on the transmission channel $\Phi_{SEL,h}$ changes the video camera that originates the video signal.

By means of access methods (for example the CDMA or OFDM methods), it is possible to further increase the number of distinct channels that can be transmitted simultaneously from a fixed station and correspond to distinct video cameras of the surveillance system, accordingly reducing the frequency band required for radio communications.

For fiber-optic communications, ATM-type access techniques are used preferably, or it is possible to use other access protocols or a platform of the IP type, in which each mobile and fixed unit is identified by a specific IP code.

In order to complete the flexibility of the fixed station, there is a control signal for traversing the video camera system related to the fixed station.

Figure 3A:
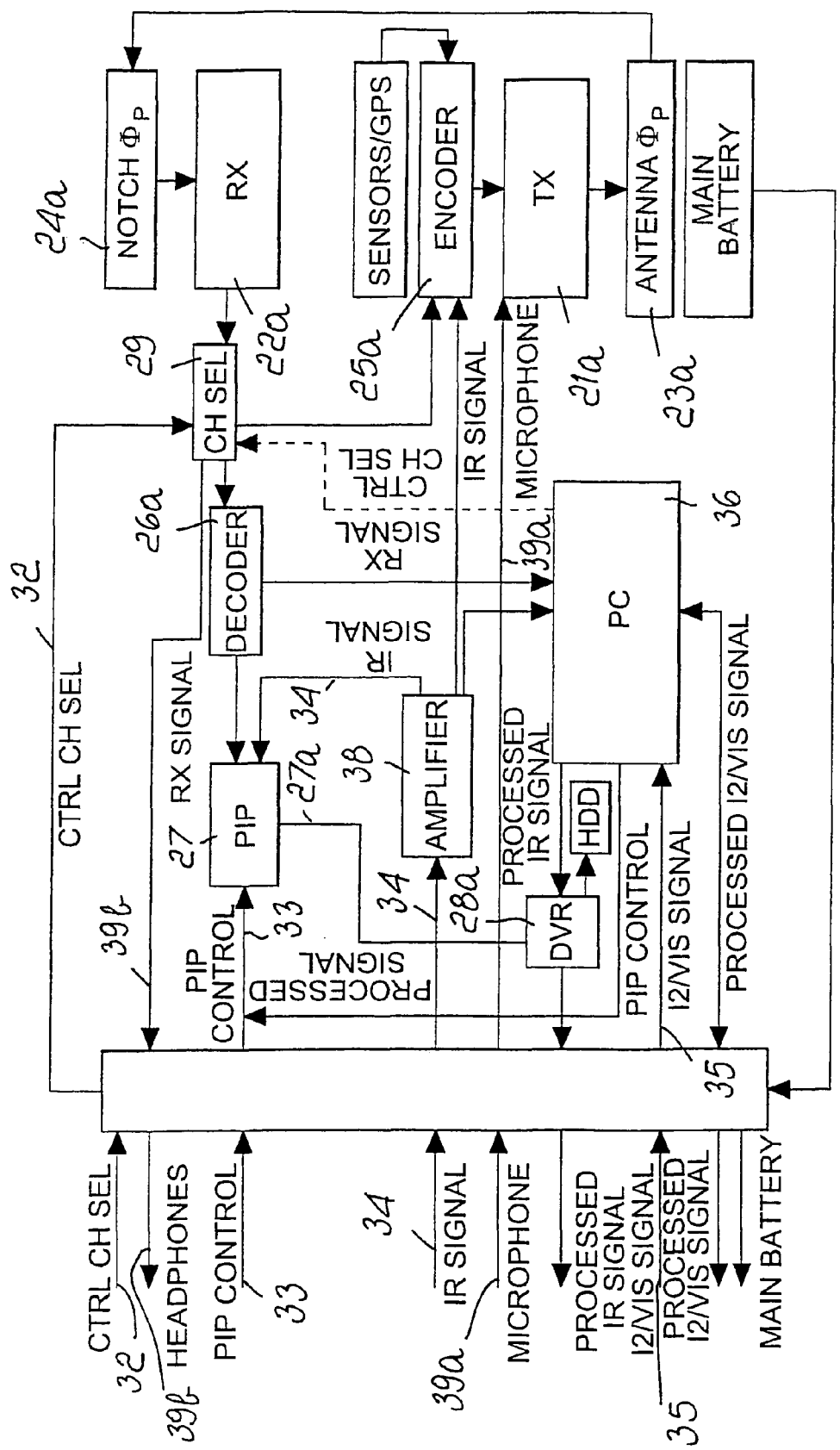

FIG. 3a illustrates the electrical connections of the various components of the electronic processing circuit in the case in which the mobile station is a helmet; the same figure also illustrates an optional PC block 36, for processing performed directly at the station.

A supporting unit 31 is mounted on the rear part of the helmet and has in input a plurality of signals that arrive from the front part of the helmet; video cameras, displays, and a control box are in fact mounted on the front part of the helmet in order to select the channels; these signals include the control signals 32 that arrive from the control box in order to select channels and the signals 33 for controlling the PIP circuit, the video signals that arrive from a first video camera 34 and from a second video camera 35, and the power supply signal, which arrives for example from a battery or system of batteries 37.

The system of batteries 37 is of the high-capacity type and is preferably composed of mutually equivalent batteries (in terms of shape, type and voltage), of the commercial type. Furthermore, the power supply system is capable of accepting also an additional external power supply, which if present disconnects the power supply provided by the power supply block 37 mounted on the portable system.

The input signals of the unit 31 are routed toward the various components of the electronic circuit. In the embodiment of FIG. 3a, the first video signal 34 is routed toward an amplifier block 38, which is connected to the PIP circuit 27, to the computer 36 and to the encoder 25a.

The unit 31 is further connected to the computer 36 in order to send the second video signal 35 directly to the computer 36 and to send the processed signal back to the unit 31 for local use.

The channel selection signal 32 is instead sent to the tunable filter 29, which is connected to the receiver 22a in input and to the decoder 26a and the encoder 25a in output.

Finally, the decoder 26a is connected both to the PIP circuit (in order to superimpose the received image and the image encoded in the first video signal 34) and to the computer 36 (in order to perform further processing).

The PIP circuit 27 receives in input the PIP control signal 33 from the unit 31 and an additional control signal from the computer 36.

Finally, the computer 36, or as an alternative the PIP circuit, is connected to the image recording means 28a and 28b in order to store the first video signal 34 after the processing of the computer 36 or the video signal 27a that is output by the PIP circuit 27; the video signal passes through the digital recorder and is resent to the display located in the front part of the helmet.

Optionally, there are additional connections for including a GPS signal or the measurement of sensors on the mobile station in order to detect environmental characteristics such as temperature, humidity, pressure, radioactivity, which can also be transmitted by means of the transmitter provided on the mobile station.

Optionally, additional connections for transmission of audio signals can be provided.

The connections shown in FIG. 3a are merely a possible example of the mutual connections among the various components of the electronic processing circuit of a mobile station.

Figure 3B:
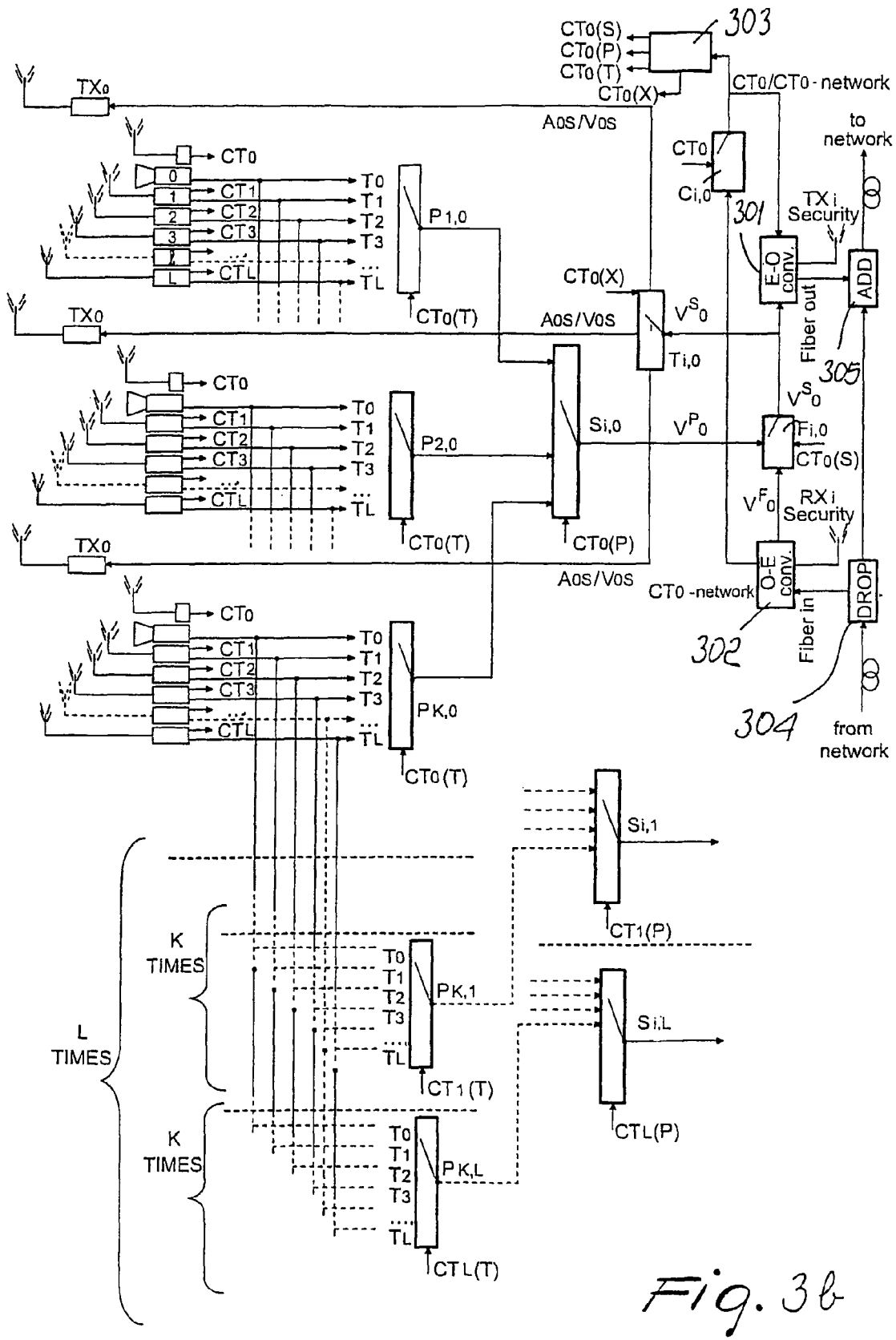
FIG. 3b is a view of a structure for mutually connecting the various stations of a surveillance system.

FIG. 3b is a more detailed view of the internal connections of the various components of the fixed station $P_K$ and of the connections to the fiber-optics network of the surveillance system.

In order to limit the band occupied on the fiber-optics system and therefore the number of wavelengths required, a selective transmission and reception system is used in the manner described hereinafter. This system can operate either without the ADD/DROP module, therefore using a single wavelength with which it is possible to transmit up to j audio/video signals and j control signals, or in combination with the ADD/DROP module, which allows to increase the number of wavelengths that are present on the network in the manners described hereinafter.

In the case of a selective fiber-optics transmission/reception system, instead of having one wavelength for each video camera connected to the system (therefore a considerable number of wavelengths in the case of a very large and complex network), preferably only the audio/video signal chosen by the operator is placed on the fiber-optics system. In this manner, the number of video signals present in the fiber-optics system decreases from N (equal to the number of fixed stations plus the number of mobile stations) to L (equal to the number of mobile stations with privilege to select the video channel among all the channels that are present on the network).

This arrangement allows to have a virtually infinite number of fixed and mobile stations (without the option to choose the intended video channel), while the system is limited only by the number L of operators (who can be mobile or located at the control center) who have the privilege to select the channels to be received and act simultaneously on the system by virtue of the corresponding L control signals, which are designated here by $CT_l$ (l=0, 1, ... L).

To facilitate the selection of the intended audio/video signal by the operator, it is convenient to group appropriately, according to a tree structure, the audio/video signals that are present on the network. This structure is convenient for using the system in critical environments, such as the subway system of a city, or other critical environments in which it is possible to group the surveillance stations into cells and macrocells with a tree-type structure as shown in FIG. 3b.

Each traffic station is identified by a value $S_i$ and comprises a certain number K of fixed surveillance stations, designated by $P_k$, where k=1, 2, ... K. Each station $P_k$ comprises L+1 audio/video signals $T_l$ (where l=0, 1, ...,L).

The various traffic stations can be grouped into areas $A_h$ (for example one area for each subway line), which in turn can be grouped into macroareas, and so forth depending on the different surveillance systems that are to interact with each other.

Such a tree-like structure allows to identify rapidly the video camera from which one wishes to receive pictures according to the region where it is located, instead of forcing the operator to scan sequentially all the video signals available on the network until he finds the one he is seeking.

An exemplifying case of the operation of the system with K surveillance stations $P_k$ with a video signal (for example IR) that originates from a video camera of the fixed station $P_k$ and optionally the audio signal that originates from a microphone installed on said station is analyzed hereafter. In general, it is possible to add another video signal that originates from a second video camera of the fixed station $P_k$, which operates in another spectral domain (for example in the visible-light domain) and is associated with the first video camera in the manner described in detail hereinafter. For the sake of simplicity, the case of a single video camera for each station, operating in a single spectral range, is considered now.

Another L audio/video signals $T_l$ for each operator who has the privilege to choose the video to be received from the fixed station $P_k$ are present at the individual station $P_k$ in addition to the video signal of the fixed video camera $T_0$.

Each one of the audio/video signals $T_0, \ldots, T_L$ of the first station $P_1$ is sent to L+1 switches (designated here by $P_{1,l}$), which have L+1 inputs ($T_0, \ldots, T_L$) and 1 output.

Likewise, the signals $T_0, \ldots, T_L$ that originate from the station $P_k$ are sent to L+1 switches (generally designated here by $P_{k,l}$, where k=1, ... ,K indicates the station and l=0, 1, . . . ,L) indicates the operator provided with L+1 inputs ($T_0$, . . . , $T_L$) and 1 output. In total, there are Kx(L+1) switches, each with L+1 inputs and 1 output.

For each traffic station $S_i$ and for each operator l, the structure comprises appropriately provided control switches $C_{i,l}$, which have in input the control signal $CT_l$ of the local operator l and the control signal $CT_{l\text{-}RETE}$ generated by an operator who interacts with a remotely located traffic station that is connected to the optical network. Each switch $C_{i,l}$ is connected in output to the optical network by means of an electrical/optical converter 301 and an ADD filter 305 and to a decoder 303, which generates in output respective control signals $CT_l(T)$, $CT_l(P)$, $CT_l(S)$, $CT_l(X)$ for the various switches of the traffic station $S_i$.

Considering for example the operator 0, said operator acts by means of the control signal $CT_0(T)$ on the switches $P_{1,0}$, . . . , $P_{K,0}$. The switch $P_{1,0}$ has in input the audio/video signals ($T_0$, . . . , $T_L$) of the station 1, which are managed by the operator 0 by virtue of the control signal $CT_0(T)$.

In output, the switch $P_{1,0}$ of the station 1 has the signal $T_l$ chosen by the operator 0.

The signals that arrive from the switches $P_{1,0}$, . . . , $P_{K,0}$ merge in a switch of the traffic station i, designated by $S_{i,0}$, which has in input K audio/video signals (one for each station), the control signal of the operator 0 $CT_0(P)$ and comprises, in output, the audio signal $A^P_0$ and/or the video signal $V^P_0$ of the chosen station. In this manner, the operator 0 has chosen the station from which the audio/video signal is to be received and the video camera or radio receiver from which the audio/video of interest originates. The same pattern applies also to all the other L operators who have the privilege of setting the audio/video that they wish to see.

The video signal $V^P_0$ chosen by the operator 0 and present in output from the switch $S_{i,0}$ is input to a switch $F_{i,0}$, which is connected in input to an optical/electric (O/E) converter 302, which in turn is connected to the optical network by means of a DROP filter in order to receive the audio/video signals from remotely located traffic stations, and to the switch $S_{i,0}$. The switch $F_{i,0}$, moreover, is connected in output to the electrical/optical converter 301 and to the radio transmitters $TX_0$ of the K surveillance stations of the traffic station $S_i$.

In terms of signal, the switch $F_{i,0}$ comprises in input the audio/video signal $V^F_0$ that originates from the optical network, in particular from another traffic station $S_j$ (with j≠i), the signal $V^P_0$ in output from $S_{i,0}$, and the control signal $CT_0(S)$, and comprises in output a video signal $V^S_0$ that is equal to the signal $V^P_0$, if the control signal $CT_0(S)$ has selected the traffic station $S_i$, or to the signal $V^F_0$, if the control signal $CT_0(S)$ has selected another traffic station $S_j$.

The chosen video signal $V^S_0$ is then sent to the electric/optical (E/O) converter 301 for transmission over the network, and to the transmitters $TX_0$ of each one of the K surveillance stations of the traffic station $S_i$, which in turn transmit the chosen video signal over the channel received by the operator 0.

As mentioned earlier, the control signal $CT_0$ can originate from one of the K surveillance stations of the traffic station $S_i$ or can originate from the network ($CT_{0\text{-}RETE}$) if the control signal is received from another traffic station $S_j$, i.e., if the operator 0 is transmitting from another traffic station different from $S_i$.

The electric/optical converter 301 that receives the video channel associated with the operator 0 can therefore receive also the control signal $CT_{0\text{-}RETE}$ associated with said operator.

The control signal $CT_{0\text{-}RETE}$ and the signal CT0 are provided at the input of a switch $C_{i,0}$. If the signal $CT_0$ is zero (i.e., if operator 0 is not in the traffic station $S_i$), the switch $C_{i,0}$ selects the control signal $CT_{0\text{-}RETE}$ as the control signal to be sent to all the switches of the traffic station $S_i$ by means of the decoder 303. If the signal $CT_0$ is different from zero and therefore contains information regarding the address of the video camera of interest (i.e., the operator 0 is in the traffic station $S_i$), the switch $C_{i,0}$ selects the control signal $CT_0$ as the control signal to be sent to all the switches of the traffic station $S_i$.

The signal in output from the switch $C_{i,0}$ is sent to the electric/optical converter 301 together with the selected audio/video signal ($A^S_0$, $V^S_0$) and introduced in the network by means of the ADD filter 305.

The result is that on the network there is always the control signal $CT_{0\text{-}RETE}$ of the operator 0, which acts on all the switches of the network, selecting the intended traffic station, station and video camera, and the audio/video signal that originates from the chosen video camera. Said signal, present on the entire network, is available and is transmitted by all the transmitters $TX_0$.

The same structure described above is repeated for the remaining L operators who have the privilege to interact with the surveillance system. Therefore, on the network there are, in the fiber-optics system, L+1 audio/video signals and L+1 control signals, introduced with the same methods described above.

In order to reduce the interference of the transmitted signal due to electromagnetic overlaps from adjacent surveillance stations, it is possible to integrate the decoder 303 with a comparator of the levels of the control signals $CT_0$ that arrive from the various surveillance stations K and are received by the decoder 303 and with a switch $T_{i,0}$ of the traffic station $S_i$. The switch $T_{i,0}$ is connected in input to the output $V^S_0$ of the switch $F_{i,0}$ and is connected in output to the radio transmitters of the K surveillance stations of the traffic station $S_i$.

Decoder 303 generates a signal $CT_0(X)$ that indicates the station that receives the strongest signal $CT_0$, which is sent to the switches $T_{i,0}$ in order to select the individual transmitter $TX_0$ of the station $P_x$ that receives the strongest signal $CT_0$, and therefore the station that lies closest to the operator 0.

With commercially available fiber-optic transmission systems it is possible to obtain easily eight channels for audio/video and for associated controls multiplexed on a single wavelength. The possibility to add multiple wavelengths transmitted in the same fiber by virtue of CWDM or DWDM methods allows to create networks with a large number of operators, who can interact simultaneously and use the chosen video signal picked up from the network or from any other operator, thus making available a virtually infinite number of separate video signals with a low system cost.

Each station, in addition to sending an audio and video signal, can optionally send data related to the station to which the selected video signal belongs; these data can be superimposed on the video image by virtue of the PIP system; the signal in output from the PIP component can then be encoded by means of the encoder 25a or 25b and then transmitted over a channel in the manners described earlier. The data signal management methods would be, in this case, the same as those of the audio signals associated with the video signal of a video camera of a station.

Optionally, it is possible to send over the transmission channel of the fixed video camera, instead of an audio signal, data that originate from optional sensors of the fixed station, with environmental information (temperature, humidity, radioactivity, presence of toxic or noxious pollutants, and others) and processing performed by virtue of additional elements not shown in the figure, such as for example a rangefinder for detecting the distance of the station from the site of the accident, optionally in combination with an angle measurement system (for example of the gyroscopic type) that can accordingly provide a more accurate location of the site of the accident.

These signals are also added to the fiber in the manner described previously.

The system of switches described for the operator 0 is repeated for all the other L operators. For example, for the operator 1, the station $P_1$ sends the audio/video signals $(T_0, \ldots, T_L)$ to the switch $P_{1,1}$, on which the control signal $CT_1(T)$ acts. According to the control signal, one of the audio/video signals is sent to the traffic station switch $S_{i,1}$, which in turn is connected to a switch $F_{i,1}$, and so forth, as for the operator 0.

If in the station $P_k$ there are j video cameras, fixed or mounted on mobile surveillance stations that operate in different spectral domains, the total number of signals in input to a switch $P_{k,l}$ is equal to j•L. The process for selecting the signal to be received remains the same as the one described earlier.

Each receiver module of a fixed station $P_k$, shown schematically in FIG. 3b as the module l that has in output the signals $T_l$ and $CT_l$, is composed of a system for receiving the video signal and the audio signal from the mobile station $M_{h,j}$ on the channel $\Phi_{h,j}$, which has in input a notch filter meant to eliminate or mitigate the excessive intensity of the carriers of the frequencies emitted in transmission by the station $P_k$, received due to the mutual proximity of the receiver and the transmitter. The same module l includes a second receiver for receiving on another service channel the image change control signal related to a separate video camera, whose signal is present in the surveillance network. On the channel on which the control signal is present there may be other complementary information related to the mobile station, such as for example the location of the mobile station, detected by means of the GPS system provided on the mobile station, or environmental information again related to the mobile station (temperature, humidity, radioactivity, presence of toxic or noxious pollutants, and others) or control of traversal by the mobile station or of the focus of the video cameras of the fixed station $P_K$ from which the mobile station receives the picture, in order to improve the visibility of the area of interest.

The channels used by radio are two for each operator equipped with a single video camera (one channel in transmission and one channel in reception for each video signal). If the individual mobile station generates more than one video signal (for example if it comprises video cameras that operate in different spectral conditions), said signals are multiplexed, as shown, through a multiplexer and are transmitted on a single channel or on two separate channels.

The number of radio channels required for L operators, each provided with j separate video cameras, is $q_{max}=2j\times(L+1)$, considering an additional channel $\Phi_{SEL,1}$ on which the signal of the most significant video camera is transmitted, optionally with the addition of information on the part of a control center that is available to all stations that are enabled to receive the video signal.

As it will be explained with reference to FIG. 8, in the preferred embodiment the various traffic stations (either of the same or different areas) are connected to the fiber network so as to form a ring.

Using suitable access and multiplexing techniques, the channels can be reduced in number.

The fixed station $P_K$ is completed by an alarm sensor (for example of the pyroelectric type that can be activated by abnormal heat generation), which generates an alarm signal that activates the station $P_K$ and accordingly makes the surveillance system shift from a surveillance status for normal control to an alert status in which all the described functions are active. As an alternative, it is possible to generate the alarm by using software that detects the abnormal motion of objects or people and accordingly generates an alert signal.

In the mobile stations, the means for transmitting and encoding their own signal, the means for receiving and decoding the signals of other stations and the PIP circuit constitute a self-sufficient module that is removable and can be interchanged among different users.

As mentioned several times above, the information available to a user can be increased by combining a plurality of video cameras that operate in different spectral ranges.

For example, one particular embodiment comprises a video camera 41 that operates in the visible-light range (VIS), a video camera 42 that operates in the infrared range (IR), and a video camera with image intensifier 43 that operates in the near infrared ($I^2$), all arranged so as to acquire the environmental image on a same optical input axis 44.

The IR video camera preferably comprises a sensor of the FPA (Focal Plane Array) microbolometric type, with resolutions that can vary from 160×120 to 320×240 to 640×480 depending on the manufacturer of the IR video camera. As an alternative, it is possible to use IR video cameras with InSb or quantum well sensors, the latter being optionally sensitive to two different spectral intervals simultaneously on the same focal plane.

Figure 4A:
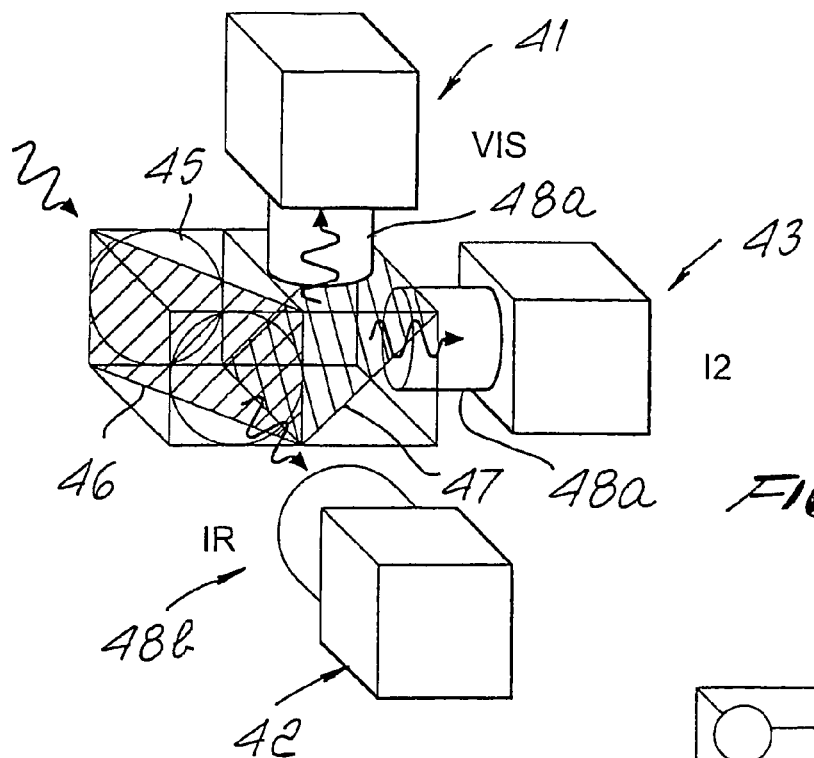
FIG. 4a is a perspective view of the arrangement of video cameras that operate in different spectral regimes.

In order to separate the spectral components of the environmental image and project the image onto the video cameras from a same viewpoint, the video cameras are arranged as in FIG. 4a and splitter laminas are used.

According to what is shown in FIG. 4a, the video cameras 42 (IR) and 41 (VIS) are mounted on the station in perpendicular acquisition directions, while the video camera 43 ($I^2$) is mounted in an acquisition direction that lies at right angles to the plane on which the other two video cameras are arranged.

An input eyepiece 45 is mounted in axial alignment with the acquisition direction of the IR video camera; a first splitter lamina 46 for transmitting infrared frequencies and reflecting the other frequencies is mounted in axial alignment between said input eyepiece and the lens of the IR video camera, with an inclination of 45° with respect to the direction of acquisition of the IR video camera.

A second splitter lamina 47 for transmitting near-infrared frequencies and reflecting the other frequencies, is fitted at the intersection between the direction of acquisition of the VIS video camera and the direction of acquisition of the $I^2$ video camera, with a 45° inclination.

Optionally, there are additional filters of the interference or acoustooptical type for reducing selectively the spectral band in input to the video camera; said filters are not shown in the figure.

The optical path between the input eyepiece 45 and the lens of each video camera must be the same for all the video cameras, and so must their viewing field, so as to have a correct overlap of the images in the various spectral domains; it is possible to insert suitable optical systems before the lens of each video camera in order to compensate for variations caused by the different dimensions of the FPA sensors of each video camera and by the different behavior of the lenses in distinct spectral domains.

On the basis of the arrangement described above, it is possible to send the spectral components of an environmental image to the respective relevant video camera.

Figure 4B:
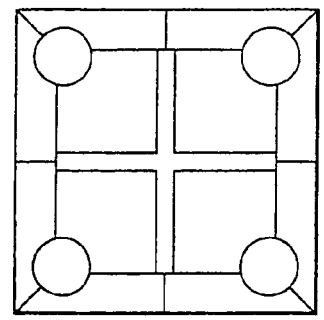
FIG. 4b is a view of an example of a common reference for calibrating the proportionality coefficients to be applied to the various video cameras by means of the magnification coefficient of the optical systems arranged in front of them, in order to have a perfect match of the images in the various spectral domains with a 1:1 scale ratio.

A lens with an optical zoom and adjustable focus (48a, 48b, 48c), both preferably motorized, is mounted in front of each video camera so as to be able to scale appropriately the size of the picture and allow the perfect overlap of images of different spectral domains. For this purpose it is possible to take a common reference (FIG. 4b) that allows to calibrate appropriately the size of the images and accordingly the appropriate magnification ratios in the various spectral domains in order to achieve the intended overlap. The filament with four disks shown in the figure is made of a material that is opaque to radiation of the spectral domains into which the radiation is split (for example opaque to heat radiation and to visible radiation) and is arranged on the eyepiece 45, which is transparent to the spectral domains being considered, and is removable. This allows to correlate the focus of the various video cameras and to set a proportionality coefficient that allows the perfect overlap of the images of different spectral domains.

As an alternative, other forms of calibration with removable targets arranged at a certain distance (for example 7-10 meters) are considered; these calibrations are performed during production instead of directly in the field.

The particular arrangement of video cameras and splitter laminas described above is merely an example, and many other arrangements can be proposed in the light of this particular arrangement according to the knowledge of a person skilled in the art.

By means of the PIP circuit included in the station, the pictures acquired by the three IR, VIS and $I^2$ video cameras can be arranged side by side or perfectly superimposed on a single display, wherein, as explained earlier, the VIS video signal is an alternative to the $I^2$ signal in the case of daytime and nighttime vision respectively. Other types of video camera combinations that operate in different spectral domains and other methods for displaying a picture on a display are in any case possible without losing the possibility to superimpose thanks to the fact that all the video cameras have the same optical axis.

In the case of single-display viewing, said display can be a commercial backlit one, for example of the TFT type, or of the self-emitting type, such as OLED (Organic Light Emitting Display), and in general said display is not transparent. If a transmissive-type display (TOLED, Transmissive Organic Light Emitting Display) is used, viewing through the display is possible with overlap of the picture that arrives from the video camera, typically the infrared thermal cameras.

Figure 6A:
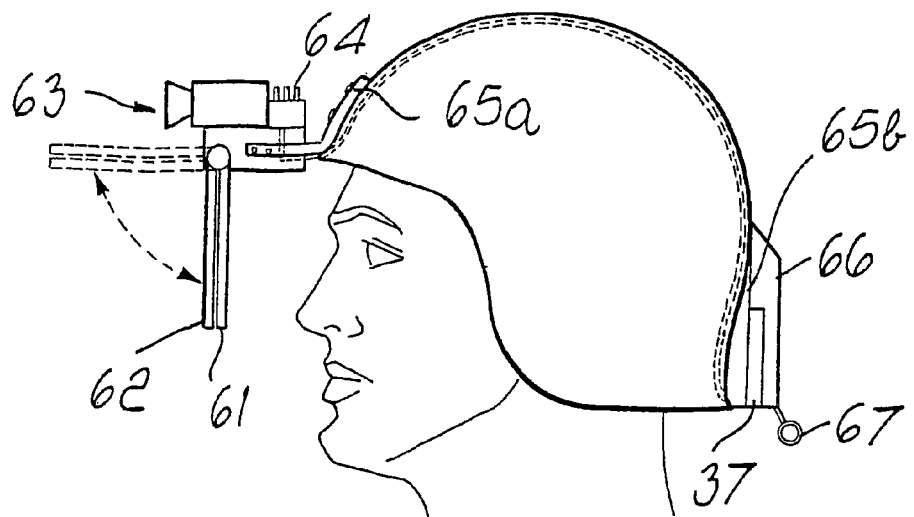
FIG. 6a is a view of a particular arrangement of the components of a helmet-mounted mobile station according to the invention.
Figure 6B:
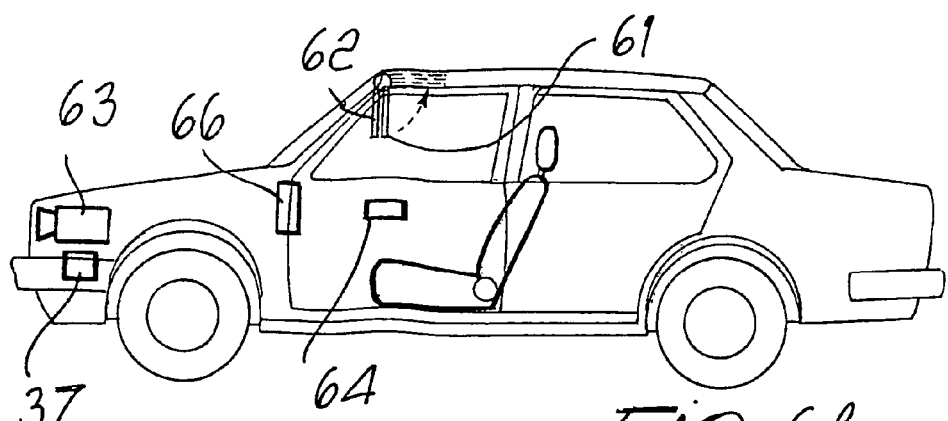
FIG. 6b is a view of a particular arrangement of the components of a vehicle-mounted mobile station.
Figure 6C:
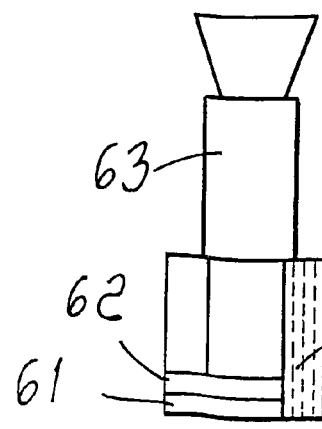
FIG. 6c is a view of a particular arrangement of the components of a portable mobile station.

As an alternative, it is possible to use two superimposed displays, of which at least one is transparent and is based on organic light emission and is of the transmissive type (TOLED, Transmissive Organic Light Emitting Display) or of the flexible type (FOLED, Flexible Organic Light Emitting Display), as shown in FIGS. 6a-6c.

In greater detail, a first transparent display 61 is mounted in the foreground with respect to the viewpoint of the user, and a second display 62 (for example an LCD or FOLED) is mounted in the background with respect to the user's viewpoint. By means of the control circuit, the pictures acquired by the IR video camera are displayed on the first display 61 and the pictures acquired by another video camera (VIS or $I^2$) are displayed on the second display 62.

It is possible to superimpose IR pictures displayed on the first display and VIS pictures displayed on the second display, and it is also possible to superimpose images that arrive from other stations with a PIP method.

If the mobile station receives, from a mobile or fixed station, a visible and IR video signal on a dual channel, the same type of display of pictures on superimposed displays can be used also on the PIP image displayed together with the actual image, wherein the display 61 displays thermographic images and the second display 62 displays images in the visible domain, according to the same type of PIP (the dimension and position of the PIP frame coincide in the two displays).

Since the display is close to the eyes, in order to limit the negative effect of electromagnetic emission on the eyes, a screen (not shown in the figures) is optionally interposed which has an integrated mesh of conducting material that allows to limit the electromagnetic stress affecting the eyes of the user.

Moreover, in mobile and fixed stations there are advantageously removable modules for expanding the viewing field of the user.

With reference to FIG. 5a, in order to deflect the viewing field of at least one video camera 54 or of a system of video cameras such as the one described above, there are first of all means for deflecting the environmental image 51 that are mounted upstream of said video cameras of the station. The deflection means 51 comprise in particular motorized means and a mirror 52 that is mounted on them in order to reflect the environmental image onto the video camera along a plurality of angles and consequently expand the viewing field.

The mirror 52 ideally reflects radiation at wavelengths comprised between approximately 400 nm and 14 µm.

The motorized means, in the preferred embodiment, consist of a galvanometer 51a on which the mirror 52 is mounted; the mirror is mounted so that it lies on the same axis of acquisition 53 as the video camera 54 and can rotate, under the control of the galvanometer, between two extreme angular positions 52a and 52b (with inclinations, with respect to the normal to the acquisition axis 53, of $\alpha_{max}$ and $\alpha_{min}$ respectively). In this manner, the environmental images reflected by the mirror 52 in the various angular positions are acquired by the video camera 54 and are displayed on a display, increasing the viewing field. If $\theta$ is the angle of the viewing field of the video camera, the new extended viewing field is equal to $N_{FOV}=(\alpha_{max}-\alpha_{min}+\theta)$; if for example $\theta$ coincides with the deflection angle of the galvanometer ($\alpha_{max}-\alpha_{min}$), the viewing field is doubled.

If the oscillation frequency of the galvanometer is low (typically 0.5 Hz), a rotating image is displayed on the display.

With a higher oscillation frequency it is instead possible to display a single picture; in order to allow synchronization with the PAL and NTSC systems, the preferred oscillation frequency of the galvanometer is comprised between 25 and 30 Hz. Image acquisition occurs by means of a shutter 57 (FIG. 5a) that is arranged outside the image input cone, is synchronized with the intended acquisition position and operates at twice the oscillation frequency of the galvanometer (50-60 Hz), in order to allow two acquisitions in two points according to an angle $\alpha_{max}$ and $\alpha_{min}$ respectively.

The dimensions of the display must be such as to allow viewing of the two images side by side; as an alternative, the two images can be displayed respectively on two displays arranged side by side.

The deflection system is preferably mounted in fixed stations and is used as an alternative to traversal in the case of limited rotation angles; in particular, it becomes particularly useful if it is used as a rapid aiming system for fixed stations, orientating the viewing field in the intended direction by rotating the mirror on the galvanometer, instead of turning the traversal, with an enormously faster response and repositioning speed.

As an alternative, the viewing field can be extended in one direction by moving along a guide the video cameras of the station (which are mutually rigidly coupled), according to an oscillation that can be for example sinusoidal. The video camera system does not rotate about its own axis but traces a circular arc-like path on the guide that is similar to the circular path traced by the eyes with respect to the rotation point of the neck. The radius is determined by the distance of the eyes from the neck, which is typically 20 cm, and the length of the circular arc depends on the intended viewing field. If θ is the corner of the viewing field of the video camera, the new extended viewing field is equal to $N_{FOV}=(2\alpha+\theta)$.

The oscillation frequency can vary according to the type of use of the images acquired by the video cameras. A slow oscillation (frequency lower than 5 Hz) is used to show the field with a 4:3 display and so that the full image fills the entire display. It is also possible to use a wider display in which the image moves according to the rotation performed.

With reference to FIGS. 5b and 5c, it is possible to improve the user's vision by adding to the deflection means 51 described above means that allow stereoscopic vision.

The means for stereoscopic vision comprises two eyepieces 55a and 55b for acquiring environmental images from two symmetrical viewpoints that are orientated parallel to the same optical axis of acquisition 53 as the video camera (FIG. 5b).

Each eyepiece is coupled to a respective reflective means 56a and 56b (for example another mirror), which is inclined with respect to the optical input axis 53 by an angle γ in order to reflect the environmental image onto the mirror 52 that is mounted on the galvanometer. These reflective surfaces 56a, 56b and 52 are not necessarily flat, but can be curved and therefore able to better focus the image onto the video camera, in order to reduce the dimensions of the reflective surfaces and of the optical systems, in order to contain the entire viewing field of the video camera.

Figure 5D:
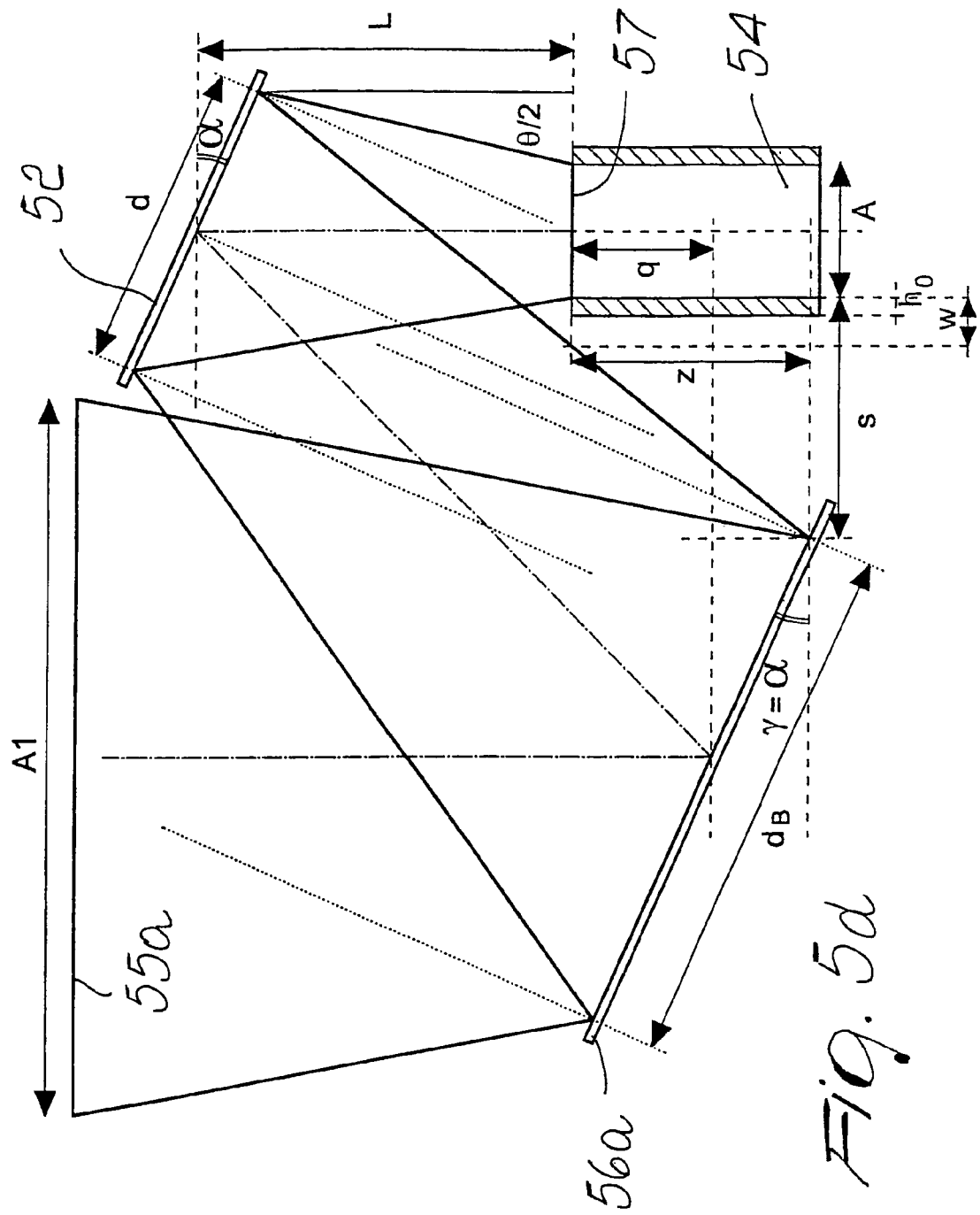
FIG. 5d is a view of the viewing field obtained by means of the rotation of a mirror arranged on a galvanometer motor, taking into account the visual cone of the video camera and allowing to make remarks regarding the minimum dimensions of the optical systems and their location.

In the embodiment shown in FIGS. 5b-5d, the angle γ coincides with the angle α of maximum mechanical rotation of the galvanometer (typically ±20°). Other configurations are of course possible in which γ is different from α; if γ<α it is possible to achieve improved peripheral vision.

Optionally, due to speed and image stability requirements, the angle γ can be smaller than the angle α of maximum rotation of the galvanometer.

As shown in FIG. 5c, the optical elements cited so far, i.e., the two eyepieces 55a and 55b, the mirrors 56a and 56b, the deflecting mirror 52 mounted on the galvanometer and the video camera 54 are not all arranged on the same plane but are arranged spatially on two separate planes that can be parallel or mutually inclined. The embodiment with two parallel planes is shown in FIG. 5c.

The embodiment shown in FIG. 5c illustrates an optional lens system 58a and 58b for improving picture quality, which can be inserted easily without compromising the functionality of the other elements that compose the stereoscopic vision system; arranging additional elements within the optical path has the immediate consequence of extending said optical path and therefore forces larger dimensions for the optical elements arranged along the path.

The arrangement of the various optical elements on two separate planes allows to reduce considerably the length of the optical path in relation to the size of the video camera lens and of its viewing field, which are fixed parameters set by the manufacturer.

FIG. 5d in fact deals with the problem of the size of optical systems and of their positioning depending on the deflection angle α of the mirror mounted on the galvanometer, on the aperture of the lens A of the video camera, of the thickness $h_o$ of the enclosure of the lens, and of the viewing field of the video camera θ.

To prevent the image reflected by the mirror 52 from interfering with the lens of the video camera 54, the distance w between the corresponding outer radius that limits the viewing field of the video camera and the lens A of the video camera is greater than the value $h_o$ of the thickness of the container of the video camera, i.e., $w \geq h_o$. To allow this condition to occur, if L is the distance between the aperture of the lens A and the center of the mirror 52 (located at the galvanometer axis), said distance must be greater than a minimum value that allows to have $w \geq h_o$. The minimum value of L obtained for $w=h_o$ corresponds to $L_{min}$ and is directly proportional to the aperture A, to the thickness of the mount $h_o$, and to the width of the viewing field θ, while it is inversely proportional to the angle α of deflection of the first mirror upstream of the video camera, according to the formula $$L_{min} = \left\{ (A+h_o) \cdot \frac{1+\tan(\alpha)\tan(\theta/2)}{\tan(2\alpha-\theta/2)-\tan(\theta/2)} + \frac{A}{2} \cdot \tan(\alpha) \right\}.$$

On the other hand, one must consider that the inclination a leads, if greater, to a limit value that makes the mirror 52 collide against the lens 54.

It is demonstrated that an optimum inclination a in the case of a thermal camera with a lens having an aperture of 25 mm and a vertical viewing field θ=12° is on the order of 40°. This allows to have $L_{min}$ values on the order of 20 mm.

Another important parameter for the image deflection system is the dimension d of the mirror mounted on the galvanometer, which is demonstrated to be proportional to the aperture A, to the distance L and to the angle α of maximum mechanical rotation.

The mirror 56a is generally larger than the mirror 52 and its dimensions, as well as its position, are both demonstrated to be a function of the parameters cited above and of the angle γ, which can also have values different from α.

The dimension of the input eyepiece 55a is proportional to the total path comprised between the aperture A and the aperture 55a, and to the viewing field θ.

The remarks made with reference to FIG. 5d apply likewise to the diagrams shown in FIGS. 5b and 5c, where in the case of FIG. 5b one considers FIG. 5d as a detail view of the left eyepiece of the stereoscopic system, while in the case of FIG. 5c one considers FIG. 5d as a detail view of the lateral vision rotated through 90°.

In view of what has been described above, it is evident that since the galvanometer in general has a maximum range of the deflection angle of ±20°, it would force an excessive length of the optical path of the stereoscopic system if all the optical elements were arranged on the same plane. The fact of having two separate planes on which the optical elements are arranged allows to apply also laterally (FIG. 5c) the same remarks made with reference to FIG. 5d and to incline the galvanometer by an optimum angle (as mentioned earlier, 40°) regardless of the range of the galvanometer. Furthermore, thanks to the fact that the width of the vertical viewing field θ is generally smaller than the horizontal dimension, there is an additional benefit in terms of compactness of the system and of reduction of the dimensions of the optical systems.

With a galvanometer oscillation frequency preferably comprised between 25 and 30 Hz, the images are acquires alternately by one eyepiece and by the other; the acquired images are reflected toward the video camera, superimposed and displayed on the display with a frequency of 50-60 Hz.

The mobile stations that comprise the means for stereoscopic vision comprise a display whose dimensions are sufficient to allow viewing with both eyes, for example 5 inches.

As an alternative, one display for each eye is used in order to obtain a stereoscopic vision in which each display receives the image from the respective eyepiece due to the synchronization provided by the electronic control system, which sends to the left display the images that arrive from the left eyepiece, which are received when the deflection angle of the galvanometer has a value $-\alpha$ and vice versa for the right eyepiece. Even in the case of binocular vision, it is possible to use for each eyepiece two superimposed micro-displays, at least one of which is of the TOLED transmissive type, with the types described earlier.

The PIP circuit, the video cameras operating in different spectral domains with the same optical axis, and the removable modules for expanding the viewing field of the user constitute the three components for improving the user's vision of the monitored environment.

By combining vision from different spectral domains with the possibility to obtain three-dimensional images (3D), it is possible to obtain, with two superimposed displays according to the methods already described, the following combinations:

a first display with a 2D visible-light image and a second display with a 2D black and white/color IR image;

a first display with a 2D $I^2$ image and a second display with a 2D black and white/color IR image;

a first display with a 3D visible-light image and a second display with a 2D color or black and white IR image;

a first display with a 3D visible-light image and a second display with a 3D color or black and white IR image;

a first display with a 3D $I^2$ image and a second display with a 2D black and white/color IR image;

a first display with a 3D $I^2$ image and a second display with a 3D black and white/color IR image.

FIG. 6a illustrates a mobile station on a helmet 60. As explained previously, a first transparent display 61 is mounted in the foreground with respect to the user's viewpoint, and a second display 62 (for example LCD or FOLED) is mounted in the background with respect to the user's viewpoint. The first display 61 is connected to the IR video camera and the second display 62 is connected to the VIS video camera.

The IR and VIS video cameras are mounted in the front part of the helmet and are illustrated schematically by the block 63.

The mobile station is mounted on a helmet by means of a supporting structure or adaptor 65 that comprises a front support 65a, a rear support 65b, and a connector that is external to the helmet 65c.

The video cameras 63, the control box and the displays 61 and 62 are mounted on the front support 65a.

The battery 37, the audio/video transmitter/receiver, the digital audio/video recorder (or alternatively a microcomputer) and any balancing weights, depending on the number of components that are present on the front support 65a, are mounted on the rear support; preferably, the communication means (designated by the reference numeral 66 in FIG. 6) are mounted on the rear support 65b.

The rear support is completed by coupling elements 67 for fixing the supporting structure 65 to the helmet.

The advantage of this system is that it can be anchored to the helmet without requiring modifications or holes in the helmet in order to provide stable fixing, thus maintaining the original type approval of the helmet. This system of adapters therefore does not require a new type approval for the protection provided by the helmet, since it has the same impact as a peak applied externally to the helmet.

Figure 6D:
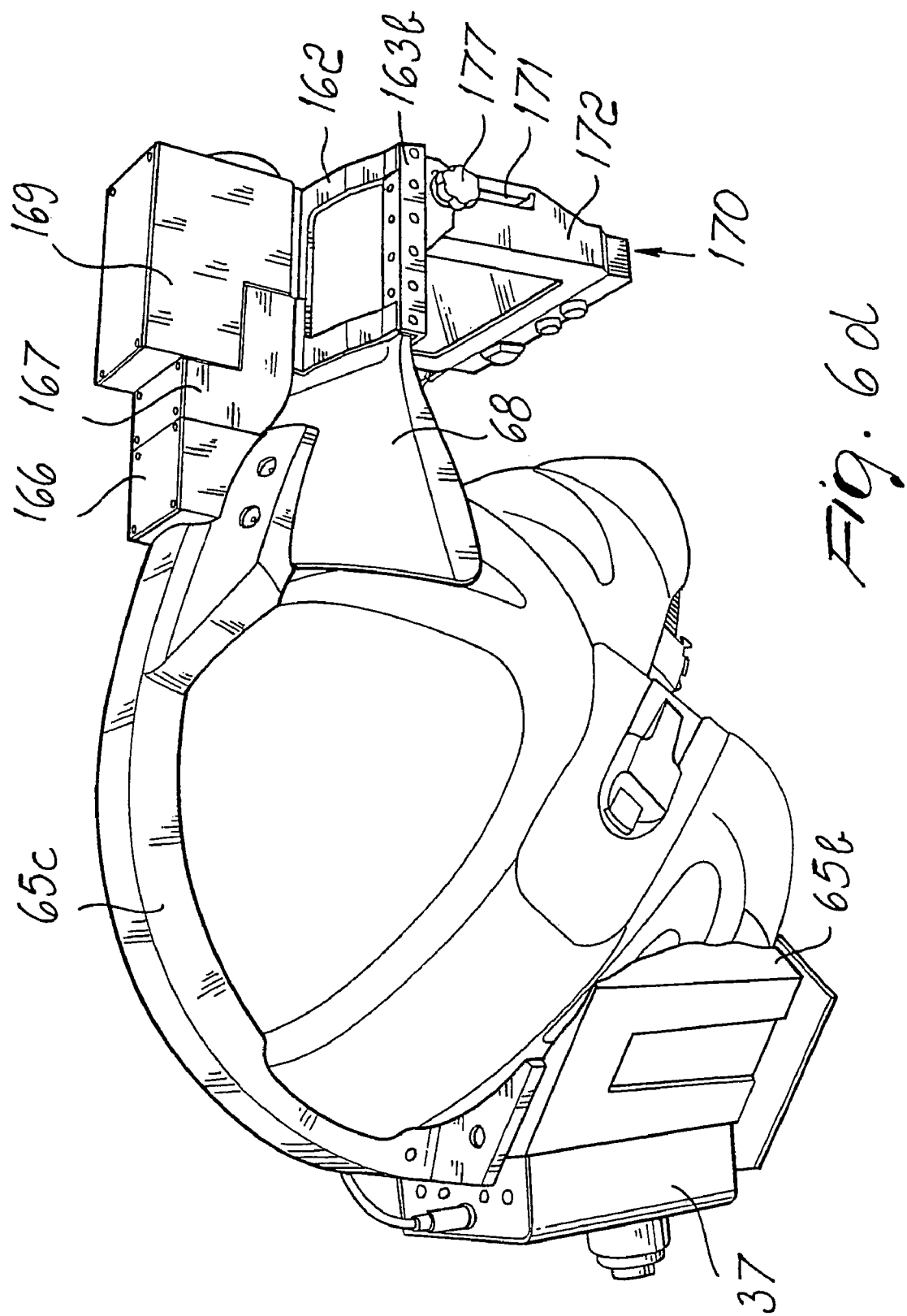
FIG. 6d is a view of a device for anchoring on a helmet according to a particular aspect of the invention.

A preferred embodiment of a helmet provided with an anchoring device 65 is shown in greater detail in FIG. 6d.

The front part 65a of the anchoring device comprises a front adapter 68, which substantially has the shape of a rigid peak which, when fitted on the helmet, protrudes substantially at right angles to the front region of the helmet. The adapter 68, also termed "peak" herein, comprises an undercut 65d, while the rear adapter 65b comprises an undercut 65e.

The undercut 65d is shaped complementarily to the edge and/or front surface of the helmet, while the undercut 65e is shaped complementarily to the edge and/or rear surface of the helmet.

Preferably, the peak 68 is connected to the rear adapter 65b by means of a connector 65c, which is preferably shaped complementarily to the upper surface of the helmet, in order to prevent any movement of the components of the anchoring device with respect to the helmet. The anchoring device thus constituted can therefore bear considerable loads and space occupations.

The peak 68 comprises means 166, mounted thereon, for connection to the battery and a frame 163 for supporting the video camera, the display and the control circuits.

FIG. 6f is a front sectional view of an example of a frame 163, which comprises a supporting bridge 162, which comprises video camera supporting means 167 that are arranged substantially centrally with respect to said bridge 162, and comprises anchoring elements 163a, 163b for the detachable fixing of the frame 163 to the peak 68.

The anchoring elements 163a and 163b are arranged at the opposite ends of the bridge 162 and are suitable to be inserted slidingly on the peak 68 by means of hooks 164a and 164b. The anchoring elements furthermore comprise respective flanges, which are directed downward or substantially at right angles to the peak 68 and comprise pivots 168a, 168b, in order to support rotatably at least one display 170.

Optionally, the anchoring elements 163a and 163b comprise grub screws (screws which have a retractable ball on one end) 165, which can engage the display or the supporting structure of the display 170 in order to lock its position.

As an alternative to the grub screws, in order to lock the rotation of the display about the pivots 168a and 168b it is possible to use hand screws 177 or other locking means that are clearly within the grasp of the person skilled in the art.

The means for supporting the video camera 167 are fixed to the bridge 162 and preferably comprise at least one hermetic front connector 167a for electronic connection to a video camera, at least one hermetic rear connector 167b for the wired electronic connection of the video camera, of the display and of the control circuit to the battery (which is mounted on the rear part 65b of the anchoring device), and finally a dovetail joint 167c for mechanical fixing of the video camera 169 to the support 167.

The display 170 can be connected directly to the video camera or, as an alternative, to an additional connector provided on the video camera supporting means 167.

In an alternative embodiment, not shown, if the helmet already has a rigid peak, the front part 65a of the anchoring device does not comprise a peak but comprises only a frame that is similar to the frame 163 that can be fastened to the peak of the helmet.

The fact that mounting on the helmet is not direct but occurs preferably by means of an adaptor is due to the convenience of being able to better adapt the vision system (video cameras, display, transceiver device and battery) to any type of helmet without the need to provide a complete helmet unit. Rescuers and law enforcement agents in fact already have protective helmets that are specifically studied and certified for their corresponding use. The advantage of not having to redesign the helmet lies in the manufacturing cost saving (each mold of an entire helmet entails high development and certification costs). In order to be able to adapt the vision system to any kind of helmet and to further limit the costs of this adaptation, the vision system is not mounted directly on a helmet but is indeed mounted on an adaptor or auxiliary support 68.

The function of this auxiliary support is to always have the same interface for mutually connecting (mechanically and electrically) the various modules of the vision system, while the part for fixing to the helmet changes according to the kind of helmet.

This allows economy in manufacturing on the part of the manufacturer, since instead of having to manufacture countless different containers for the vision system, it is possible to produce a single container that has the same mechanical shape, with the electrical connections arranged according to a standard layout. This also allows economy on the part of the user organization, since operators of a same organization or even of different organizations, be they police corps, firefighters or military personnel, who use helmets of different shapes, can use the same vision system, with the only expense of the adaptor for their type of helmet, adding flexibility without affecting costs.

In the embodiment shown in FIG. 6a, the two displays are mounted so that they can rotate on the front support 65a, so that they can be lowered or raised by the user in order to allow direct vision.

Figure 6E:
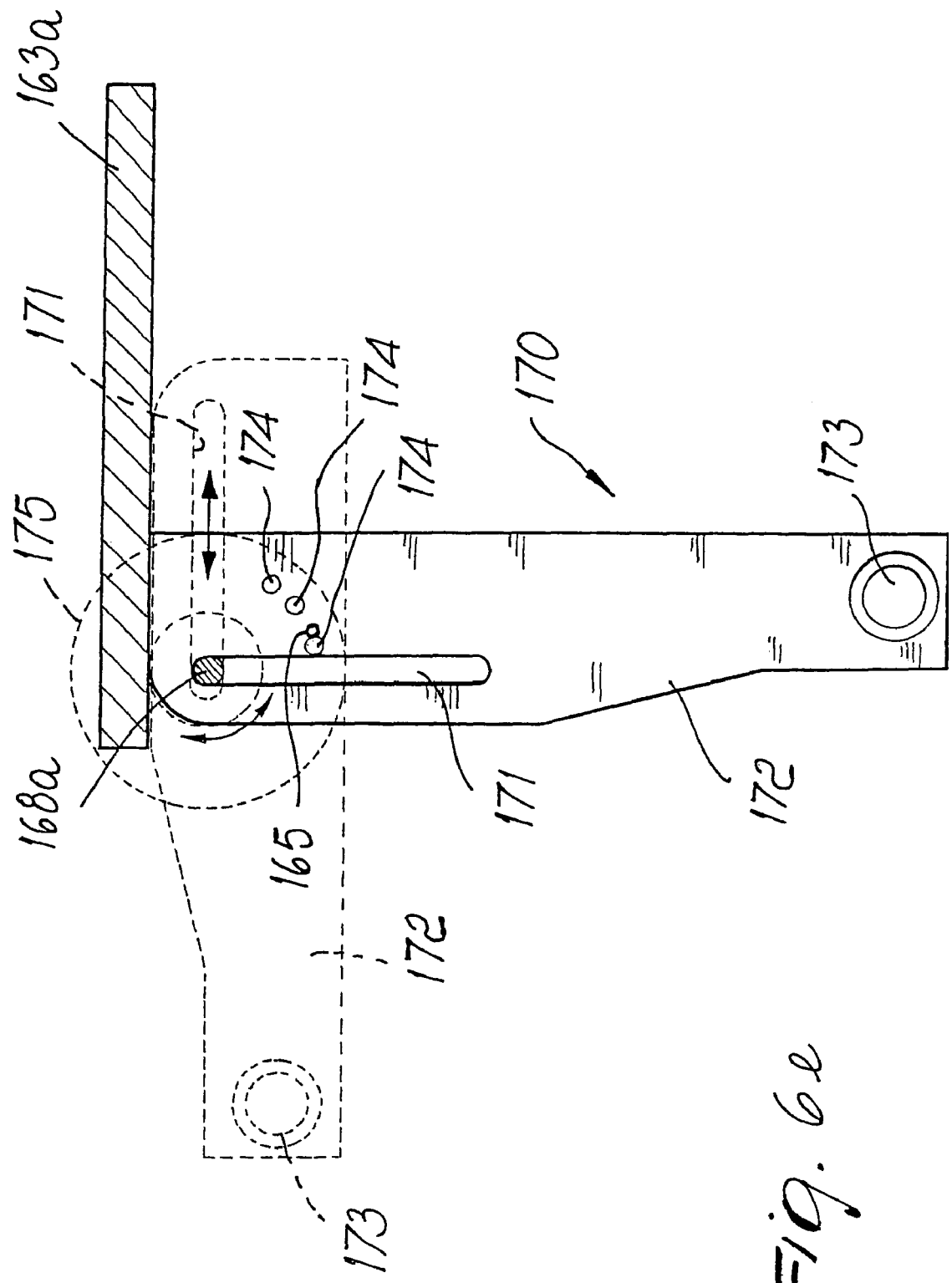
FIG. 6e is a view of a detail of the structure for supporting the displays to be mounted on the helmet according to the invention.

FIG. 6e schematically illustrates an assembly for mechanical rotation of the display according to a preferred embodiment of the invention, in which the coupling between the display and the peak is of the pin-and-guide type.

In particular, the display is integrated with a support 170 and comprises, on two opposite side walls 172, respective guides 171. The guides 171 consist of linear slots, but it is equally possible to provide grooves or other guiding means capable of allowing a combined rotary and translational motion of the display 170 with respect to the peak 68 and the frame 163.

The pin-and-guide coupling allows the display 170 to assume two extreme positions, particularly a horizontal position that is close to the helmet, in which the display lies substantially parallel to the peak, and a vertical position that is spaced from the helmet, in which the display lies on a plane that is substantially perpendicular to the peak, so as to allow the operator who wears the helmet to view the images on the display.

The side walls 172 of the display 170 optionally comprise recesses 174 (or, as an alternative, protrusions) for interacting with the grub screws 168a and/or 168b, so as to adjust the position of the display at various inclinations with respect to the vertical position.

In the embodiment shown in FIG. 6d, the walls 172 comprise a threaded hole that is suitable to accommodate the hand screw 177.

The horizontal position of the display is maintained by means of the retention provided by the peak 68.

The display 170 preferably has a rounded shape at the edge that slides on the frame 163 during rotation, so as to allow easy rotation.

The grub screw must be arranged inside the circle 175 that is centered on the pin and has a radius equal to the distance between the center of the pin and the viewing surface of the display, when the support 170 is in the horizontal position. The distance between the stroke limit position and the guide 171 of the support of the display is equal to the distance of the grub screw from the guide of the display when the display is in the horizontal position.

The connection between the display and the support 166 occurs by means of a cable with IP68 hermetic terminals. The cable is sheathed with materials that increase its resistance to heat and to corrosive agents.

Each module is connected to the other module electrically by means of normal connectors or connectors that provide a hermetic seal up to IP69 with n pins, through which all the control signals, video signals and the power supply pass. The signals are routed by the control box 64, which allows, by means of buttons, to modify the controls according to the contingent requirements of the user. From a mechanical standpoint, conventional locking means are used to fix the vision system to the adapter. For the sake of convenience, the control box 64 is comprised within the display module 170, allowing to have the available buttons and options in front of the operator in a simple and visible manner.

While the video camera and the display are again mounted on a peak by means of an adaptor, the main battery 37 is mounted by means of an adaptor that is located in the rear part 65b of the helmet. The battery 37 can be connected by means of an external electrical cable provided with a fireproof and waterproof sheath to a battery carried in a backpack. The battery 37 fixed on the helmet can also be omitted, if the mobile unit is connected directly to the battery that is present in the backpack, and in the case of particularly dangerous areas, where it can be used as the only power source so as to avoid problems related to overheating of the helmet as a consequence of excessive heat sources.

In an embodiment that is alternative to the one shown in FIGS. 6a-6f and in particular in the case of helmets provided with a protective peak, a display of the FOLED type can be mounted directly inside the peak (for example in a gas mask) due to its flexibility and adaptability.

The image received from the mobile station is displayed with a PIP system on the picture of one's own video camera, which is always present, as shown for example in FIG. 4d. This allows to never lose sight of what is in front of the user who is operating in emergency conditions, and to have additional information available, displayed with the picture-in-picture system and therefore superimposed on one's own picture.

If used on a helmet for private users, for example for motorcyclists, the system of FIG. 6a is further simplified, since it comprises the same elements provided in the system of FIG. 6a but has a simplified image processing system, i.e., without the image recording system and with a transmission and reception system that allows to access only some channels assigned to private users but does not allow access to channels dedicated to law enforcement operators or to rescuers, as will become better apparent hereinafter.

If used on a motorcycle helmet, the display is of the FOLED type integrated in the peak and is optionally removable and interchangeable with a normal peak, or is of the TOLED type, in order to allow viewing of the road through the display, or is of the micro-display type, having a diameter comprised between 1 and 2.5 inches and referred only to a single eyepiece if the display used is not transparent and integratable with a second eyepiece if the display is of the TOLED type.

The application of the concepts described up to now to the case of a mobile station of the vehicle-mounted type is illustrated with reference to FIG. 6b.

The vehicle-mounted station comprises the same functional modules that are present on the helmet (the same reference numerals are used for the sake of simplicity for components that have a function that is identical to the components that have been already described); in particular, the vehicle-mounted station comprises at least one video camera 63 (which is mounted in a front position with respect to the vehicle), a battery 37 (which is mounted within the engine compartment), a pair of displays 61, 62 (which are mounted on the parasol), a control box 64, and transmission and reception means 66 that are mounted inside the cabin.

As occurs in the case of the helmet used for private use or for law enforcement, there is a difference between the law-enforcement vehicle and the private vehicle in terms of the number of channels to which it can have access to receive pictures from the surveillance network and to send control commands to said network. In the case of a rescue vehicle, the functional modules are exactly identical to those of the generic mobile station as shown in FIGS. 3a and 4a, with access to all the functionalities described so far, whereas for private use the signal transmission and reception system is preferably simplified and reduced in its flexibility, allowing fully passive reception and transmission that can be activated in case of a critical event such as fog, fire, accident occurring in the area where the vehicle is passing, with the only option for the user to be able to change channel (and therefore viewpoint) by using the transmission of video cameras of the surveillance system, including private vehicles themselves, which have said system and are passing in the area of interest. The system, when active, allows to use the pictures that arrive from vehicles located in the area and to provide said pictures to said vehicles, with integration of the images that arrive from the fixed video cameras. In this case it is possible to avoid accidents or to avoid approaching of regions where the accident has occurred at a speed that does not allow to avoid the impact in the disaster area. This functionality is particularly useful in the case of poor visibility due to fog or thick smoke. Rescue vehicles are given access to all the video cameras of the surveillance system, including those mounted on private vehicles, and additional vision systems described hereinafter. This application is described in greater detail hereinafter.

The display on the vehicle is preferably performed by means of a TOLED display (one or more according to the complexity of the system), which is located in front of the driver at the sunshade and is integrated therein. Said display can therefore move up and down as occurs in the case of the helmet.

The modules can be composed so as to form a camouflaged system for investigation purposes; the system can in fact be concealed by inserting it in containers of a material that allows IR transmission (for example polycarbonate or other plastic materials) and has the same shape as commercial containers that are commonly used (ski boxes to be installed on a vehicle, rigid bags on a moped or on the shoulder, et cetera), which are located in the same positions in which the actual items are placed, with an untraceable investigation function.

By virtue of the possibility of plastic materials to be transparent to near-infrared radiation (typically 700 nm) and far-infrared radiation (typically 3-5 microns or in some cases even 7-14 microns), while they are opaque to visible-light wavelengths (typically 400-700 nm), it is possible to provide portable vision units that are concealed inside containers that are adapted to avoid attracting attention, allowing for investigation purposes to take pictures even in much closer positions without raising the slightest suspicion.

The communication means 66 are preferably of the detachable type; in particular, they consist of a transceiver unit of the UMTS type, which can be easily removed and used separately for multimedia and ordinary mobile telephone applications.

The use of the functional modules shown in FIGS. 3a and 4a and applied to a hand-held portable system is shown with reference to FIG. 6c.

In this case also, it is necessary to make a distinction between the case of law enforcement agents from the case of a private user, since as mentioned above there will be differences in terms of the number of channels to which access is provided in order to receive pictures from the surveillance network and send control commands to said network, as occurs for the other station types.

Both for law enforcement agents and for private users, it is possible, where available, to use the advantages of communications of the UMTS type.

If the surveillance system is connected to a UMTS network, it allows in fact to send the images that originate from this system to users that are equipped with a UMTS terminal, even a commercial one, and therefore it allows to use images in critical situations that are made available on dedicated channels, which are activated in critical situations and are read by terminals located in the area where the disaster is occurring. The UMTS device is provided optionally with a button that has the specific function of calling for connection to the emergency service and of requesting the sending of images from the location where the request is activated; i.e., if the two conditions of picture sending request and of surveillance system alarm activation occur simultaneously, the transmitter of the surveillance system starts to send pictures to the UMTS terminal that requested them.

Figure 7:
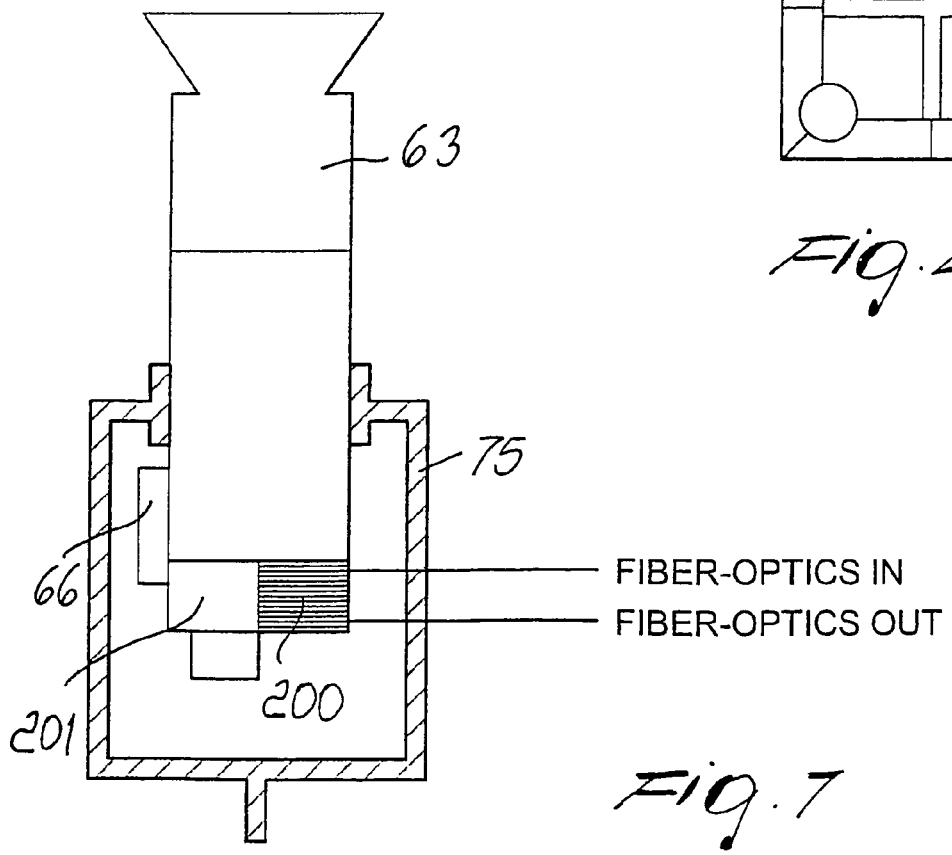
FIG. 7 is a view of a particular arrangement of the components of a fixed station.

With reference to FIG. 7, the fixed station is mounted on a support 75, and in addition to the elements shared by the various stations, such as the video camera or the system of video cameras 63, the electronic control circuit and the means for communication with the other stations 66, it comprises said alarm means 74 for transmitting alarm signals to other stations, the means for electrical/optical and optical/electrical conversion 201, and the ADD-DROP module 200.

During the operation of the surveillance system, the fiber-optic network contains multiple channels M that correspond to a matching number of mobile surveillance stations enabled to choose the channel to be received.

Each traffic station $S_i$, constituted by multiple fixed surveillance stations $P_k$, corresponds to a node of the fiber-optic network and inputs therein the signal of fixed video camera selected by the operator that corresponds to that node (there is more than one video camera, of the visible-light and infrared types, for each node) and the multiple audio/video signals received by that node from the adjacent mobile stations.

The type of remote video camera, whose signal is transmitted at the frequency $f_K$ by the fixed system, is selected by means of a radio control $CT_{0-M}$ transmitted by the mobile station $M_h$.

Figure 8:
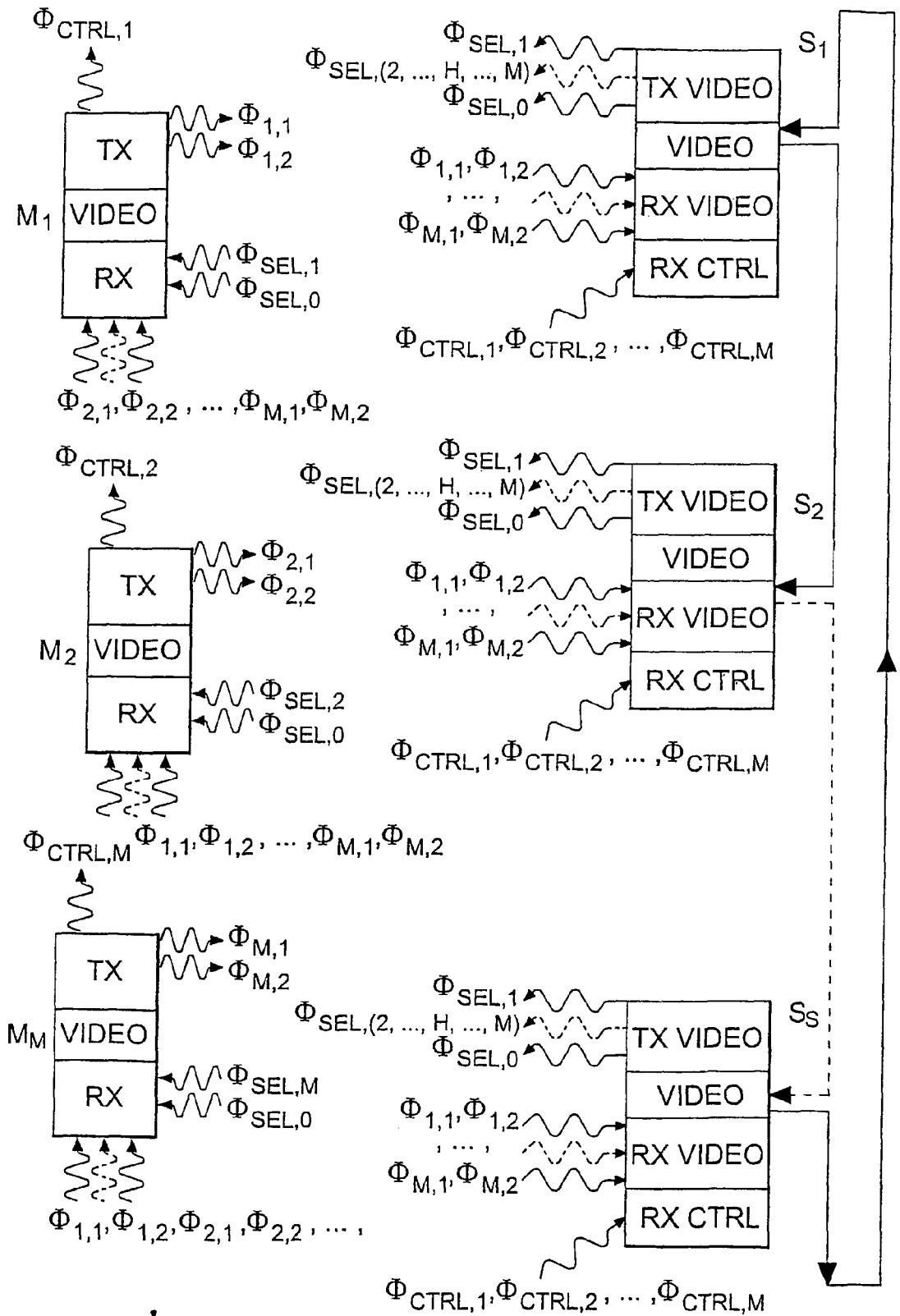
FIG. 8 is a more detailed diagram of the channels for communication between fixed stations and mobile stations.

With reference to FIG. 8, the surveillance system according to an embodiment of the invention can be described in greater detail as follows.

In reception, it is possible to receive video pictures that originate from a central computer (located in a control center) and contain much more information than the transmitted pictures, i.e., the pictures acquired by the operator $M_h$ can be transmitted on the channel $\Phi_{hj}$ to a remote computer, processed and resent to the operator $M_h$ at the reception frequency $\Phi_{SEL,0}$.

The surveillance system is provided with $S_i$ fixed stations, each of which is connected to a respective node $F_i$ in a transmission network, for example a fiber-optics network, which has a ring structure and in which all the pictures of the video cameras are carried on fiber optics, as shown in FIGS. 1 and 8; these structures in turn can be connected to each other, forming a cluster structure. It is possible to define macrocells that correspond to a specific area to be subjected to surveillance (for example a highway tunnel or a city tunnel or a wooded area or an industrial site or a nuclear site or a shopping center with a concentration of people), mutually connected by means of a fixed network termed Core Network.

Consider a surveillance system composed of $F=F_{IR}+F_{VIS}$ fixed video cameras (where $F_{IR}$ is the number of fixed IR video cameras and $F_{VIS}$ is the number of fixed VIS video cameras), and composed of $M=M_C+M_V+M_P$ mobile video cameras, whose number can vary depending on the active operators; $M_C$ indicates the number of helmet-mounted mobile stations, $M_V$ designates the number of vehicle-mounted mobile stations, and $M_P$ designates the number of portable mobile stations.

The operation of the system is as follows. Each node introduces in the fixed network (Core Network) the signal of the fixed video cameras that correspond to that node and the signals transmitted by the M mobile stations, which are transmitted by radio from the generic station $M_h$ on two channels ($\Phi_{h,1}$ for IR and $\Phi_{h,s}$ for VIS). If a single channel is available, transmission for IR is preferred.

The IR or VIS video signal can be a signal of the stereographic type in order to allow 3D display; in this case, unless video signal compression is performed, this transmission occurs at the expense of a widening of the band of the corresponding channel.

In this manner, a node located in another point of the surveillance system can transmit by radio an image received from a fixed video camera $F_k$ or from a mobile video camera $M_h$ received in any other point of the system. Each station is in fact simultaneously a transmitting and receiving point.

Transmission from the node K occurs on the channel $\Phi_{SEL,0}$ and on 2M channels $\Phi_{SEL,M}$. Therefore, the mobile station $M_h$ can receive the signals that arrive from the other adjacent mobile stations $M_j$ ($j \neq h$), for example by means of direct transmission between for example $M_h$, and $M_j$ by means of the channel $\Phi_{j,1}$ and $\Phi_{j,2}$ and from the fixed station $F_K$ on the channel $\Phi_{SEL,h}$.

In the simplest case, all the nodes of the system transmit at the same frequency $\Phi_{SEL,0}$. In general, the mobile station $M_h$ receives the signal from the most "convenient" node that allows it to have the highest signal level. The type of video camera of a remote mobile or fixed station whose signal is transmitted is transmitted on the channel $\Phi_{SEL,j}$ by the fixed system and is selected by means of a radio control transmitted by the station $M_j$ on the channel $\Phi_{CTRL,j}$. The fixed station that generates an alarm on the basis of the sensing of an external sensor or of a software for processing the acquired images introduces the video signal in the network and transmits it to all the other nodes on the wavelength $\lambda_0$ and wirelessly to all the mobile stations on the channel $\Phi_{SEL,0}$.

More generally, the channel $\Phi_{SEL,h}$ is selected by means of a radio control transmitted by the station $M_h$ by means of a service channel $\Phi_{CTRL,h}$, and typically on the channel $\Phi_{SEL,0}$ one receives by default the video camera $F_K$ that generates the alarm by means of an external sensor or by means of image processing software and transmits the signal that arrives from the node $F_K$ to all the other nodes.

The image received preferably from the mobile station is displayed with a PIP system on the image of one's own video camera, which is always present. This allows to never lose sight of what is in front of the user who is operating in emergency conditions and to have additional information displayed with the PIP system and accordingly superimposed on one's own image.

Furthermore, the PIP system can be used to display on a single display both the image that arrives from a video camera that operates in the visible-light range and the image that arrives from a video camera that operates for example in the infrared range.

The surveillance system, as already mentioned, can be integrated in a UMTS system. In order to use a UMTS system, the transmission frequency is comprised between 1885 MHz and 2025 MHz or 2110 MHz and 2200 MHz, and a CDMA access protocol is used for transmission and reception, each terminal being identified by an identification code.

The advantages of the integration of the surveillance system in a UMTS system are that it is possible to manage the signal over a commercial network that is expected to be widely available in the territory of every country and with efficient coverage, optionally with the aid of satellites.

Furthermore, integration allows to improve signal management in case of overlap of signals transmitted by adjacent nodes, increasing the number of channels available for services and controls (selection of intended channel, sending of control signals, et cetera). Finally, integration allows a user provided with a UMTS terminal to use the information received from the surveillance system, allowing to identify escape routes in case of fire or disaster and to have communication messages regarding the actions to be taken. By means of software managed by a control center, it is in fact possible to display an escape route or at least indicate the location of fires or dangerous areas to be avoided.

Figure 9:
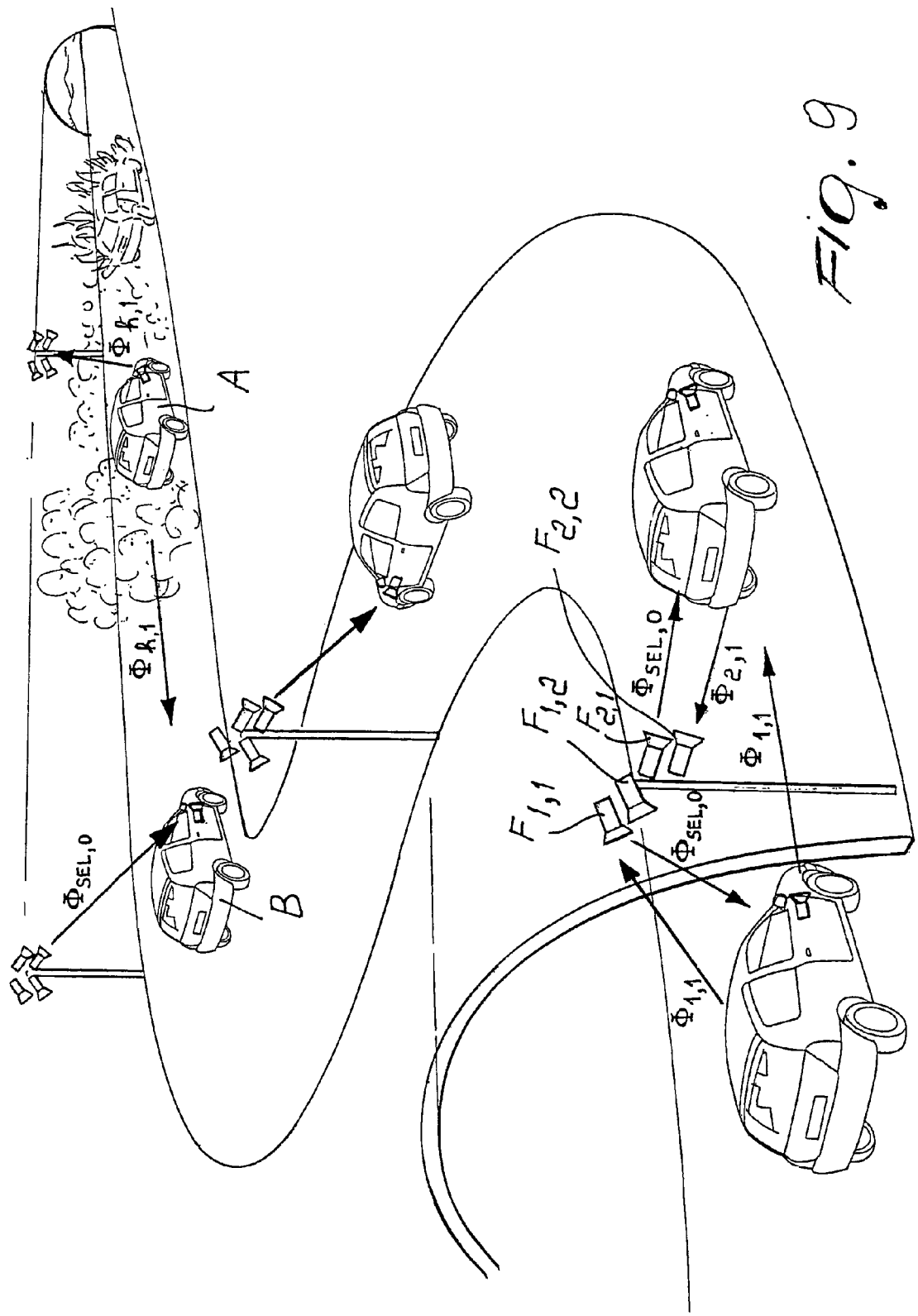
FIG. 9 is a view of an application of the surveillance system in automotive applications.

With reference to FIG. 9, this use is applied for example in the monitoring of cars, subway or rail tunnels, where the smoke generated by a fire would prevent location of the accident and of the path to be taken to escape. In this case, the video cameras of the fixed stations ($F_{1,j}$, $F_{2,j}$, ...) located in the tunnel can transmit to a motor vehicle or to a person the pictures that are proximate to the point of the accident.

Likewise, if stations according to the invention, i.e., stations comprising video cameras, display means and means for transmission/reception as described above, are mounted on motor vehicles, a motor vehicle that is located in the vicinity of the accident can send the pictures to the surveillance system, making them available to other motor vehicles, which can therefore avoid entering the danger zone. At the same time, the individual motor vehicles can receive the pictures that arrive from the transmission system and take the appropriate actions for independent rescue.

If the motor vehicle A is in the vicinity of the accident, the pictures are sent by the motor vehicle A to the surveillance system and made available to other motor vehicles $B_i$ that follow and can thus avoid entering the danger area. At the same time, the motor vehicles can receive the pictures that arrive from the transmission system and take the appropriate self-rescue actions.

Reception by the vehicle occurs from the nodes that correspond to the $F_K$ fixed stations located along the road or in the tunnels, and the video signal that is transmitted is the signal of the most significant video camera, on the channel $\Phi_{SEL,0}$ on which it is possible to transmit messages or indicate escape routes together with the data of where the video camera is located. If the most significant viewpoint is the viewpoint of the vehicle A, the video signal transmitted on a radio channel $\Phi_{A,1}$ of A is received by the vehicle B of the private user by means of the channel $\Phi_{SEL,0}$.

Preferably, only rescue vehicles can use additionally the entire range of channels made available by the surveillance system and an additional channel $\Phi_{CTRL,h}$ for selecting the chosen video signal among all the video signals that are present in the fiber-optics system.

Finally, it is possible to consider other variations that are not shown in the figures and allow to deal with other problems that can occur in case of an accident. If it is not possible to transmit pictures from one location where an operator is located to a node of a surveillance system, it is in fact possible to use vehicles or aircraft with an independent navigation system capable of shuttling back and forth, storing pictures received from the operator and then reaching a location where they can access by radio the surveillance system and moving back and forth between the two areas that are disconnected from the point of view of communication.

Considering a robotized vehicle or another means provided with a navigation system that does not need to be remote-controlled but can move autonomously in an assigned area and can therefore enter areas that cannot be reached by a wireless or satellite or fiber-optics signal, said device takes a series of pictures of the location of interest, records them and then reaches a location that can be reached by radio signals in order to allow the transfer of the recorded pictures.

Said unit can optionally provide support for a safety operator who can enter the critical area, where the accident has occurred, with appropriate precautions that protect his personal safety but once in the critical area can no longer communicate with the outside wirelessly, for example due to the presence of shielding walls such as those that surround a nuclear reactor or the walls of caves. In this case, the robotized unit can act as a means of communication between the operator who cannot communicate with the outside environment, by shuttling back and forth between the area in which the operator is located and the area in which it is possible to communicate with the surveillance system.

In the case of aircraft, it is possible to receive pictures from all the aircraft moving on the runway, in order to perfect alert systems in case of incorrect operations. In particular, in the case of aircraft moving in an airport, it is possible to install on the airport runway coded heat sensors that locate and define their position. In this manner, the video cameras located on the aircraft can identify the position of the ground references and can simultaneously receive the pictures and the respective position also referred to the other aircraft and moving vehicles, which is vitally important in case of poor visibility due for example to fog.

Another application of the helmet is the implementation and use in high-risk centers (nuclear power stations, refineries, petrochemical facilities, centers with a high concentration of people such as stadiums, shopping centers or squares or wooded areas).

It has thus been shown that the helmet proposed allows to achieve the intended aim and objects.

The invention thus conceived is susceptible of numerous modifications and variations, all of which are within the scope of the appended claims. All the details may further be replaced with technically equivalent elements.

The disclosures in Italian Patent Application No. MI2003A000121 from which this application claims priority are incorporated herein by reference.

What is claimed is:

1. A helmet for displaying environmental images in critical environments, comprising at least one video camera and means for displaying environmental images, further comprising a supporting structure that can be anchored to said helmet in order to support said at least one video camera and said display means, said supporting structure comprising a front adapter that can be coupled to a front edge of said helmet, a rear adapter that can be coupled to a rear edge of said helmet, and a rigid connecting element for mutually connecting said front adapter and said rear adapter, further comprising a frame that is mounted detachably on said front adapter, said frame comprising means for supporting said video camera and means for supporting said display means, wherein said frame comprises a bridge-like structure that mutually connects elements for coupling to said front adapter, said elements for coupling being arranged on opposite ends, of said bridge-like structure, said bridge-like element extending from left to right, transversely with respect to said front adapter, said elements for coupling being arranged at left and right ends of said bridge-like element, said bridge-like element protruding from the front adapter so as to space said display means in front of the eyes of a person that wears said helmet, said display means being rotatable upward to be placed substantially in line with said front adapter, so as to pass from an operative position wherein the display means are arranged in front of the eyes of the person that wears the helmet to an inoperative position wherein the display means are arranged in line with the front adapter and out of the line of sight of the person that wears the helmet.

2. The helmet according to claim 1, wherein said means for supporting said at least one video camera are fixed to said bridge-like structure and comprise at least one mechanical connector for fixing said video camera to said supporting structure and a power supply connector for connecting said video camera to a power supply.

3. The helmet according to claim 2, wherein said power supply comprises a battery that is mounted monolithically with said rear adapter and comprises a cable for the connection to said power supply connector of said supporting means.

4. The helmet according to claim 1, wherein said front adapter protrudes with respect to said helmet substantially at right angles to the front part of said helmet, forming a peak, said peak comprising an edge and said coupling elements comprising hooks for coupling to said edge.

5. The helmet according to claim 4, wherein said hooks form a guide for the sliding insertion of said peak in said frame, said hooks having a substantially straight longitudinal extension.

6. The helmet according to claim 1, wherein said coupling elements comprise a respective pivot on which said display means are fixed so that they can rotate.

7. The helmet according to claim 1, wherein said display means comprise at least one display.

8. The helmet according to claim 7, wherein said display comprises opposite side walls in which there is a respective guide, each pivot of said coupling elements being engaged with the respective guide of said side walls in order to allow a combined rotary and translational motion of said display with respect to said helmet.

9. The helmet according to claim 1, wherein said front adapter and said rear adapter comprise respective undercuts whose profile is complementary to said front edge and to said rear edge respectively.

10. The helmet according to claim 1, comprising means for radio communication of environmental images, said image communication means being connected electronically to said at least one video camera and/or to said means for displaying environmental images, in order to transmit remotely environmental images acquired by said video camera and/or display on said display means environmental images acquired by a remote video camera.

11. The helmet according to claim 10, wherein said means for radio communication are mounted detachably on said rear adapter.

12. The helmet according to claim 1, comprising a PIP circuit for simultaneously displaying images acquired by different video cameras on said display means.

13. The helmet according to claim 12, wherein said PIP circuit is mounted detachably on said rear adapter.

14. The helmet according to claim 10, wherein said means for communicating environmental images comprise at least one transmitter for transmitting by radio at least one video signal of a respective video camera over a respective communication channel and at least one receiver for receiving by radio at least one video signal on a second communication channel.

15. The helmet according to claim 1, comprising means for deflecting the environmental image that are mounted upstream of said at least one video camera, said deflection means comprising motorized means and a mirror that is mounted on said motorized means upstream of said at least one video camera in order to reflect the environmental image onto said at least one video camera according to multiple angles and accordingly widen the viewing field.

16. The helmet according to claim 15, wherein said motorized means comprise a galvanometer in order to make said mirror oscillate between two extreme positions, said environmental image deflection means furthermore comprising a shutter that is mounted between said mirror and said at least one video camera, in order to acquire the environmental image at said extreme positions.

17. The helmet according to claim 15, further comprising stereoscopic vision means, said stereoscopic vision means and said image deflection means being mounted on different planes, said stereoscopic vision means comprising two eyepieces, each eyepiece being coupled to a reflecting means that is orientated so as to reflect the environmental image onto said mirror mounted on said motorized means.

18. The helmet according to claim 1, wherein said display means comprise a display chosen from the group that comprises liquid-crystal displays and displays of the organic light emission (OLED) type.

19. The helmet according to claim 1, comprising a plurality of video cameras arranged along mutually perpendicular planes and selected from the group that comprises video cameras that operate in the spectral domain of visible optical frequencies, video cameras of the thermographic type that operate in the infrared spectral domain, and video cameras with image intensifier, which operate in a spectral domain that comprises near-infrared optical frequencies.

20. The helmet according to claim 19, comprising splitter laminas in order to divide the acquired environmental images into their various spectral components and direct them toward said plurality of video cameras.

21. The helmet according to claim 1, comprising means for digital recording of the acquired environmental images, said recorder being mounted detachably on said rear adapter.

* * * * *